US008953844B2

(12) United States Patent
Williams et al.

(10) Patent No.: US 8,953,844 B2
(45) Date of Patent: *Feb. 10, 2015

(54) SYSTEM FOR FAST, PROBABILISTIC SKELETAL TRACKING

(71) Applicant: Microsoft Corporation, Redmond, WA (US)

(72) Inventors: Oliver Williams, San Francisco, CA (US); Ryan Geiss, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,167

(22) Filed: May 6, 2013

(65) Prior Publication Data

US 2013/0243255 A1    Sep. 19, 2013

Related U.S. Application Data

(63) Continuation of application No. 12/876,418, filed on Sep. 7, 2010, now Pat. No. 8,437,506.

(51) Int. Cl.
*G06K 9/00* (2006.01)
*G06F 3/01* (2006.01)
(Continued)

(52) U.S. Cl.
CPC ............. *G06F 3/011* (2013.01); *A63F 13/10* (2013.01); *G06F 3/0304* (2013.01);
(Continued)

(58) Field of Classification Search
USPC ......... 382/100, 103, 106–107, 123, 155, 162, 382/168, 180, 181, 189–199, 219, 232, 254, 382/274, 276, 291, 312, 154; 348/14.16, 348/46; 463/36, 30; 356/5.01; 359/9
See application file for complete search history.

(56) References Cited

U.S. PATENT DOCUMENTS 4,627,620 A    12/1986    Yang
4,630,910 A    12/1986    Ross et al.
(Continued)

FOREIGN PATENT DOCUMENTS

CN    101254344 B    6/2010
EP    0583061 A2    2/1994
(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.
(Continued)

*Primary Examiner* — Seyed Azarian
(74) *Attorney, Agent, or Firm* — Micah Goldsmith; Judy Yee; Micky Minhas

(57) ABSTRACT

A system and method are disclosed for recognizing and tracking a user's skeletal joints with a NUI system. The system includes one or more experts for proposing one or more skeletal hypotheses each representing a user pose within a given frame. Each expert is generally computationally inexpensive. The system further includes an arbiter for resolving the skeletal hypotheses from the experts into a best state estimate for a given frame. The arbiter may score the various skeletal hypotheses based on different methodologies. The one or more skeletal hypotheses resulting in the highest score may be returned as the state estimate for a given frame. It may happen that the experts and arbiter are unable to resolve a single state estimate with a high degree of confidence for a given frame. It is a further goal of the present system to capture any such uncertainty as a factor in how a state estimate is to be used.

19 Claims, 15 Drawing Sheets

(51) Int. Cl.
*A63F 13/40* (2014.01)
*G06F 3/03* (2006.01)
*G06T 7/20* (2006.01)
*H04N 13/02* (2006.01)

(52) U.S. Cl.
CPC ......... *G06K 9/00369* (2013.01); *G06T 7/2046* (2013.01); *A63F 2300/1093* (2013.01); *A63F 2300/6027* (2013.01); *A63F 2300/6045* (2013.01); *A63F 2300/6607* (2013.01); *G06T 2207/10021* (2013.01); *G06T 2207/10028* (2013.01); *G06T 2207/20076* (2013.01); *G06T 2207/30196* (2013.01)
USPC ............................. 382/103; 382/274; 348/46

(56) References Cited

U.S. PATENT DOCUMENTS

| | | | |
|---|---|---|---|
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,751,642 | A | 6/1988 | Silva et al. |
| 4,796,997 | A | 1/1989 | Svetkoff et al. |
| 4,809,065 | A | 2/1989 | Harris et al. |
| 4,817,950 | A | 4/1989 | Goo |
| 4,843,568 | A | 6/1989 | Krueger et al. |
| 4,893,183 | A | 1/1990 | Nayar |
| 4,901,362 | A | 2/1990 | Terzian |
| 4,925,189 | A | 5/1990 | Braeunig |
| 5,101,444 | A | 3/1992 | Wilson et al. |
| 5,148,154 | A | 9/1992 | MacKay et al. |
| 5,184,295 | A | 2/1993 | Mann |
| 5,229,754 | A | 7/1993 | Aoki et al. |
| 5,229,756 | A | 7/1993 | Kosugi et al. |
| 5,239,463 | A | 8/1993 | Blair et al. |
| 5,239,464 | A | 8/1993 | Blair et al. |
| 5,288,078 | A | 2/1994 | Capper et al. |
| 5,295,491 | A | 3/1994 | Gevins |
| 5,320,538 | A | 6/1994 | Baum |
| 5,347,306 | A | 9/1994 | Nitta |
| 5,385,519 | A | 1/1995 | Hsu et al. |
| 5,405,152 | A | 4/1995 | Katanics et al. |
| 5,417,210 | A | 5/1995 | Funda et al. |
| 5,423,554 | A | 6/1995 | Davis |
| 5,454,043 | A | 9/1995 | Freeman |
| 5,469,740 | A | 11/1995 | French et al. |
| 5,495,576 | A | 2/1996 | Ritchey |
| 5,516,105 | A | 5/1996 | Eisenbrey et al. |
| 5,524,637 | A | 6/1996 | Erickson et al. |
| 5,534,917 | A | 7/1996 | MacDougall |
| 5,563,988 | A | 10/1996 | Maes et al. |
| 5,577,981 | A | 11/1996 | Jarvik |
| 5,580,249 | A | 12/1996 | Jacobsen et al. |
| 5,594,469 | A | 1/1997 | Freeman et al. |
| 5,597,309 | A | 1/1997 | Riess |
| 5,616,078 | A | 4/1997 | Oh |
| 5,617,312 | A | 4/1997 | Iura et al. |
| 5,638,300 | A | 6/1997 | Johnson |
| 5,641,288 | A | 6/1997 | Zaenglein |
| 5,682,196 | A | 10/1997 | Freeman |
| 5,682,229 | A | 10/1997 | Wangler |
| 5,690,582 | A | 11/1997 | Ulrich et al. |
| 5,703,367 | A | 12/1997 | Hashimoto et al. |
| 5,704,837 | A | 1/1998 | Iwasaki et al. |
| 5,715,834 | A | 2/1998 | Bergamasco et al. |
| 5,875,108 | A | 2/1999 | Hoffberg et al. |
| 5,877,803 | A | 3/1999 | Wee et al. |
| 5,913,727 | A | 6/1999 | Ahdoot |
| 5,933,125 | A | 8/1999 | Fernie |
| 5,980,256 | A | 11/1999 | Carmein |
| 5,989,157 | A | 11/1999 | Walton |
| 5,995,649 | A | 11/1999 | Marugame |
| 6,005,548 | A | 12/1999 | Latypov et al. |
| 6,009,210 | A | 12/1999 | Kang |
| 6,054,991 | A | 4/2000 | Crane et al. |
| 6,066,075 | A | 5/2000 | Poulton |
| 6,072,494 | A | 6/2000 | Nguyen |
| 6,073,489 | A | 6/2000 | French et al. |
| 6,077,201 | A | 6/2000 | Cheng et al. |
| 6,098,458 | A | 8/2000 | French et al. |
| 6,100,896 | A | 8/2000 | Strohecker et al. |
| 6,101,289 | A | 8/2000 | Kellner |
| 6,128,003 | A | 10/2000 | Smith et al. |
| 6,130,677 | A | 10/2000 | Kunz |
| 6,141,463 | A | 10/2000 | Covell et al. |
| 6,147,678 | A | 11/2000 | Kumar et al. |
| 6,152,856 | A | 11/2000 | Studor et al. |
| 6,159,100 | A | 12/2000 | Smith |
| 6,173,066 | B1 | 1/2001 | Peurach et al. |
| 6,181,343 | B1 | 1/2001 | Lyons |
| 6,188,777 | B1 | 2/2001 | Darrell et al. |
| 6,205,231 | B1 * | 3/2001 | Isadore-Barreca et al. ... 382/103 |
| 6,215,890 | B1 | 4/2001 | Matsuo et al. |
| 6,215,898 | B1 | 4/2001 | Woodfill et al. |
| 6,226,396 | B1 | 5/2001 | Marugame |
| 6,229,913 | B1 | 5/2001 | Nayar et al. |
| 6,256,033 | B1 | 7/2001 | Nguyen |
| 6,256,400 | B1 | 7/2001 | Takata et al. |
| 6,283,860 | B1 | 9/2001 | Lyons et al. |
| 6,289,112 | B1 | 9/2001 | Jain et al. |
| 6,299,308 | B1 | 10/2001 | Voronka et al. |
| 6,308,565 | B1 | 10/2001 | French et al. |
| 6,316,934 | B1 | 11/2001 | Amorai-Moriya et al. |
| 6,363,160 | B1 | 3/2002 | Bradski et al. |
| 6,384,819 | B1 | 5/2002 | Hunter |
| 6,411,744 | B1 | 6/2002 | Edwards |
| 6,430,997 | B1 | 8/2002 | French et al. |
| 6,476,834 | B1 | 11/2002 | Doval et al. |
| 6,496,598 | B1 | 12/2002 | Harman |
| 6,503,195 | B1 | 1/2003 | Keller et al. |
| 6,512,838 | B1 | 1/2003 | Rafii et al. |
| 6,539,931 | B2 | 4/2003 | Trajkovic et al. |
| 6,570,555 | B1 | 5/2003 | Prevost et al. |
| 6,633,294 | B1 | 10/2003 | Rosenthal et al. |
| 6,640,202 | B1 | 10/2003 | Dietz et al. |
| 6,661,918 | B1 | 12/2003 | Gordon et al. |
| 6,674,877 | B1 * | 1/2004 | Jojic et al. ...................... 382/103 |
| 6,681,031 | B2 | 1/2004 | Cohen et al. |
| 6,714,665 | B1 | 3/2004 | Hanna et al. |
| 6,731,799 | B1 | 5/2004 | Sun et al. |
| 6,738,066 | B1 | 5/2004 | Nguyen |
| 6,765,726 | B2 | 7/2004 | French et al. |
| 6,788,809 | B1 | 9/2004 | Grzeszczuk et al. |
| 6,801,637 | B2 | 10/2004 | Voronka et al. |
| 6,873,723 | B1 | 3/2005 | Aucsmith et al. |
| 6,876,496 | B2 | 4/2005 | French et al. |
| 6,937,742 | B2 | 8/2005 | Roberts et al. |
| 6,950,534 | B2 | 9/2005 | Cohen et al. |
| 7,003,134 | B1 | 2/2006 | Covell et al. |
| 7,036,094 | B1 | 4/2006 | Cohen et al. |
| 7,038,855 | B2 | 5/2006 | French et al. |
| 7,039,676 | B1 | 5/2006 | Day et al. |
| 7,042,440 | B2 | 5/2006 | Pryor et al. |
| 7,050,606 | B2 | 5/2006 | Paul et al. |
| 7,058,204 | B2 | 6/2006 | Hildreth et al. |
| 7,060,957 | B2 | 6/2006 | Lange et al. |
| 7,113,918 | B1 | 9/2006 | Ahmad et al. |
| 7,121,946 | B2 | 10/2006 | Paul et al. |
| 7,170,492 | B2 | 1/2007 | Bell |
| 7,184,048 | B2 | 2/2007 | Hunter |
| 7,202,898 | B1 | 4/2007 | Braun et al. |
| 7,222,078 | B2 | 5/2007 | Abelow |
| 7,227,526 | B2 | 6/2007 | Hildreth et al. |
| 7,259,747 | B2 | 8/2007 | Bell |
| 7,308,112 | B2 | 12/2007 | Fujimura et al. |
| 7,317,836 | B2 | 1/2008 | Fujimura et al. |
| 7,348,963 | B2 | 3/2008 | Bell |
| 7,359,121 | B2 | 4/2008 | French et al. |
| 7,367,887 | B2 | 5/2008 | Watabe et al. |
| 7,379,563 | B2 | 5/2008 | Shamaie |
| 7,379,566 | B2 | 5/2008 | Hildreth |
| 7,389,591 | B2 | 6/2008 | Jaiswal et al. |
| 7,412,077 | B2 | 8/2008 | Li et al. |

(56) References Cited

U.S. PATENT DOCUMENTS

| | | | |
|---|---|---|---|
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,471,376 B2 * | 12/2008 | Bamji et al. | 356/5.01 |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,154,583 B2 * | 4/2012 | Kurtz et al. | 348/14.16 |
| 8,154,781 B2 * | 4/2012 | Kroll et al. | 359/9 |
| 8,303,411 B2 * | 11/2012 | Marks et al. | 463/36 |
| 2008/0026838 A1 | 1/2008 | Dunstan et al. | |
| 2008/0152191 A1 | 6/2008 | Fujimura et al. | |
| 2009/0141933 A1 | 6/2009 | Wagg | |
| 2009/0221368 A1 | 9/2009 | Yen et al. | |
| 2010/0197390 A1 * | 8/2010 | Craig et al. | 463/30 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009059065 | 5/2009 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Office Action dated Nov. 5, 2013 in Chinese Patent Application No. 201110286418.X.

Response to Office Action filed Mar. 19, 2014, and partial English translation thereof, in Chinese Patent Application No. 201110286418.X.

Qian, et al., "A Gesture-Driven Multimodal Interactive Dance System," 2004 IEEE International Conference on Multimedia and Expo (ICME), Jun. 2004, pp. 1579-1582.

Shivappa, et al., "Person Tracking With Audio-visual Cues Using the Iterative Decoding Framework," IEEE 5th International Conference on Advanced Video and Signal Based Surveillance, Sep. 2008, pp. 260-267.

(56) References Cited

OTHER PUBLICATIONS

Toyama, et al., "Probabilistic Tracking in a Metric Space," Eighth International Conference on Computer Vision, Vancouver, Canada, vol. 2, Jul. 2001, 8 pages.

Voluntary Claim Amendments filed Aug. 17, 2012 in Chinese Patent Application No. 201110286418.X.
Notice of Allowance and Fee(s) Due dated Jan. 9, 2013 in U.S. Appl. No. 12/876,418.

* cited by examiner

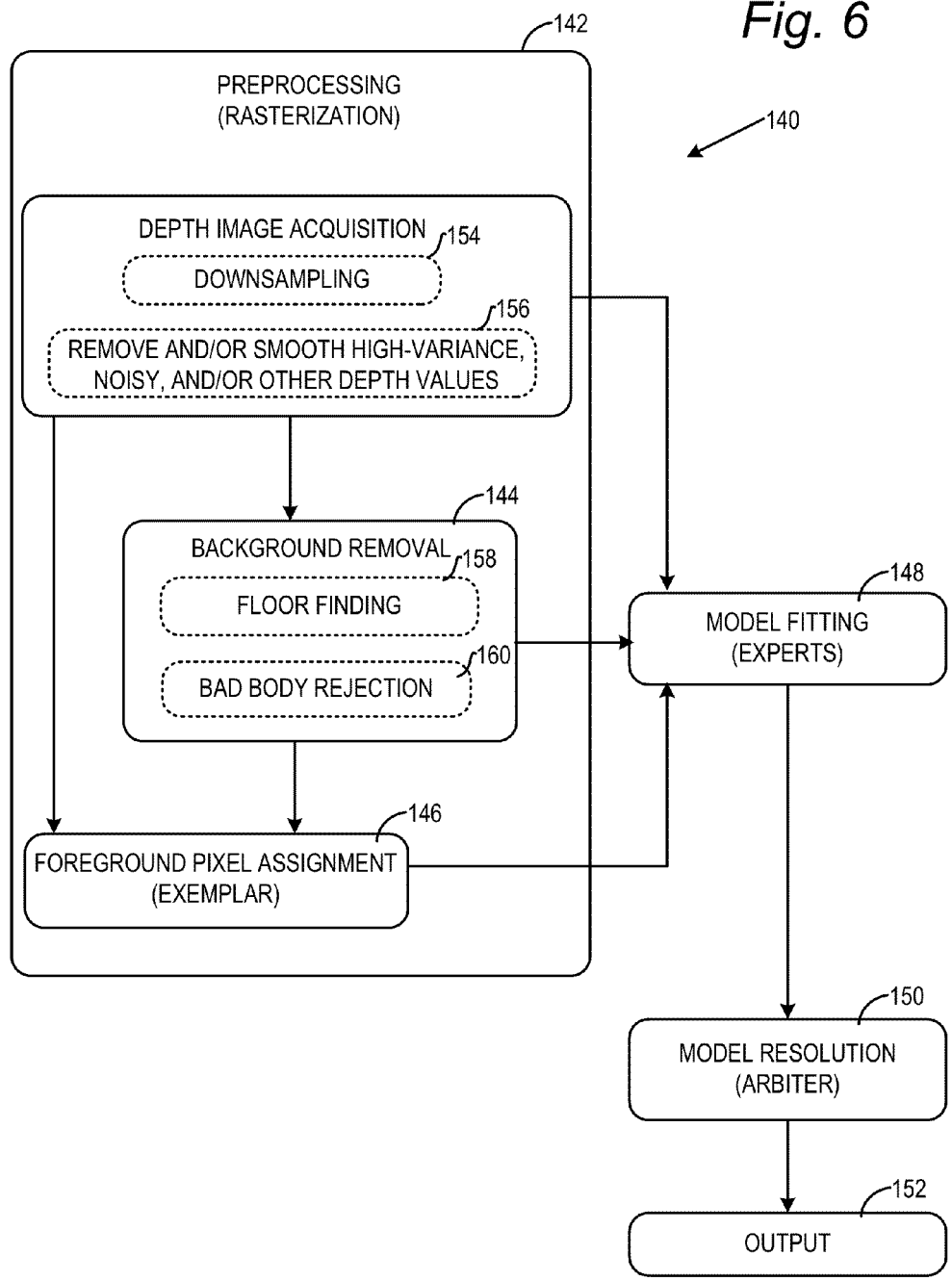

(Depth Score)

(Explained Space)

(Static Joint Configuration Score)

*(Motion Score)*

SYSTEM FOR FAST, PROBABILISTIC SKELETAL TRACKING

CLAIM OF PRIORITY

This application is a continuation of U.S. patent application Ser. No. 12/876,418 filed on Sep. 7, 2010 entitled SYSTEM FOR FAST, PROBABILISTIC SKELETAL TRACKING, to be issued as U.S. Pat. No. 8,437,506 on May 7, 2013, which application is incorporated herein by reference in its entirety.

BACKGROUND

In the past, computing applications such as computer games and multimedia applications used controllers, remotes, keyboards, mice, or the like to allow users to manipulate game characters or other aspects of an application. More recently, computer games and multimedia applications have begun employing cameras and software gesture recognition engines to provide a natural user interface ("NUI"). With NUI, raw joint data and user gestures are detected, interpreted and used to control game characters or other aspects of an application.

One of the challenges of a NUI system is distinguishing a person in the field of view of an image sensor, and correctly identifying the positions of his or her body parts within the field of view. Body-tracking routines are known for this purpose. However, these routines are either computationally expensive, requiring more processing time than is available within the frame rates of NUI systems, or they are computationally inexpensive but arrive at the correct representation of the target user only a portion of the time.

SUMMARY

Disclosed herein are systems and methods for recognizing and tracking a user's skeletal joints with a NUI system. A system to solve such a problem can be broken down into two sub-problems: identifying multiple candidate hypotheses for a given frame of image data, and then resolving them to select one or more hypotheses as a state estimate which best represents a user position for that frame. Hypotheses are generated by one or more experts. The experts propose possible skeletal hypotheses by various methods, using various sources of information including depth data, body part proposals deduced from the depth data, and past state estimates. Each expert is generally computationally inexpensive and effective, but may not produce accurate results for a given body pose. In state estimation, uncertainty is inherent in the system. However, one or more of the experts will typically result in a skeletal hypothesis closely mapping the user position. The system further includes an arbiter for resolving the skeletal hypotheses from the experts into a best state estimate for a given frame. The arbiter may score the various skeletal hypotheses based on different methodologies. The one or more skeletal hypotheses resulting in the highest score, or combinations thereof, may be returned as the state estimate for a given frame. It may happen that the experts and arbiter are unable to resolve a single state estimate with a high degree of confidence for a given frame. It is a further goal of the present system to capture any such uncertainty as a factor in how a state estimate is to be used.

In an embodiment, the present technology relates to a method of estimating state information, including: (a) receiving image data from the field of view or a scene comprised of fields of view from multiple capture devices used together; (b) producing one or more computer models estimating state information by one or more experts; and (c) analyzing the one or more computer models produced in said step (b) by one or more methodologies of an arbiter to choose one or more computer models estimated to be the best representation of the state information.

In a further embodiment, the present technology relates to a software pipeline for generating a state estimate for a given frame of captured image data, the state estimate representing an estimate of a position of a user within a field of view captured within the image data. The pipeline includes: a pre-processing routine for receiving the image data, optionally removing a background from the image data, and processing a foreground into one or more body part proposals; one or more experts for receiving information including the one or more body part proposals and generating a plurality of computer models, each computer model representing an estimation of the position of the user in the given frame of captured image data; and an arbiter for receiving the plurality of computer models, scoring the computer models by one or more methodologies which compare the plurality of computer models against depth data from the given frame and/or state estimate data from a prior frame, and outputting at least one computer model estimated by the arbiter to best approximate the position of the user in the frame.

In a further embodiment, the present technology relates to a computer-readable storage medium capable of programming a processor to perform a method tracking body parts of a user captured with a capture device as a user moves within a field of view of the capture device to determine a state estimate of the user's position in a current frame of image data captured by the capture device. The method includes: (a) receiving image data from the capture device; (b) processing the image data received in said step (a) to remove a background and generate body part proposals for images in a foreground; (c) generating a plurality of skeletal hypotheses using at least one of the body part proposals generated in said step (b) and image data from an earlier time, the plurality of skeletal hypotheses defining a probability distribution; (d) selecting one or more skeletal hypotheses as being the most probable state estimates based on the probability distribution, where the probability distribution indicates one or more skeletal hypotheses as the probable state estimate; and (e) indicating that no state estimate is determined for the frame of image data where the probability distribution does not indicate one or more skeletal hypotheses as being probable state estimates.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows a pipeline for tracking a target according to an embodiment of the present technology.

DETAILED DESCRIPTION

Figure 1A:
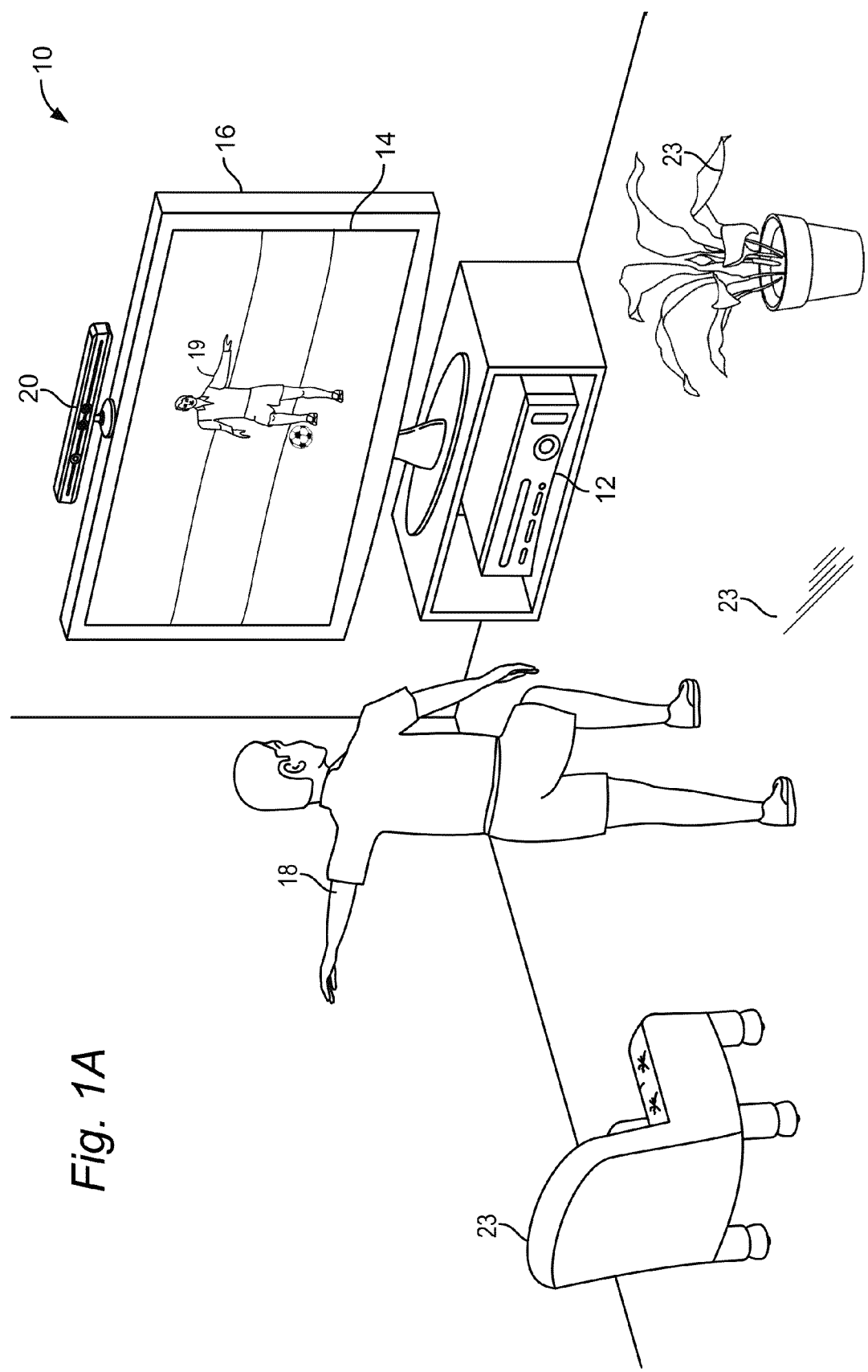
FIG. 1A illustrates an example embodiment of a target recognition, analysis, and tracking system.

Embodiments of the present technology will now be described with reference to FIGS. 1A-19B, which in general relate to a pipeline for generating a computer model of a target user captured by an image sensor in a NUI system. The computer model, also referred to as a state estimate, may be generated once per frame of captured image data, and represents a best estimate of the position, including pose, of a user during the captured frame. The generated state estimate for each frame may be used by a gaming or other application to determine such things as user gestures and control actions. The state estimate may also be fed back into the pipeline to aid in future state estimates.

The state estimate may be generated each frame (or other time period) based on raw image data, image data processed into body part proposals and/or historical state estimates. The system includes a model fitting routine for generating a plurality of candidate models, or hypotheses, and a model resolution routing for selecting one or more hypotheses estimated to be the best fit to the user position.

The model fitting routine runs a plurality of computationally-inexpensive tracking routines, referred to as experts, which receive the raw image data, body part proposals and historical state data from which the experts generate one or more hypotheses. In embodiments, the hypotheses are skeletal hypotheses, each representing positions of a plurality of the target user's joints which together form an estimated skeleton of the user position. Depending on a variety of factors, including the user pose in a given frame, the experts are able to derive skeletal hypotheses including joint position data representing the true user pose with varying degrees of success. Each expert may generate one or more skeletal hypotheses, as well as an indication of how good the hypotheses are believed to be, represented by a probability distribution of the different hypotheses.

If the probability distribution indicates that the various skeletal hypotheses are related and close to each other, this is a good indication that the skeletal hypotheses have come close to correctly modeling the true user pose for that time frame. If there are two or more clusters of hypotheses within the probability distribution, then there may be uncertainty between two or more distinct solutions. Similarly, if there is no coherence between the skeletal hypotheses in the probability distribution, then again there may be uncertainty as to a solution.

The skeletal hypotheses, and the indication of how good the skeletal hypotheses are believed to be, are fed to the resolution routine, referred to herein as the arbiter. The arbiter may include various scoring methodologies which evaluate the various skeletal hypotheses across the probability distribution. In general, the arbiter may test how well the skeletal hypotheses match the depth data and/or historical state estimates. These tests may measure whether points in a given skeletal hypothesis exist in the actual depth data. These tests may also measure how completely a skeletal hypothesis explains the available data, i.e., whether there are additional points in the depth data that are not explained by a skeletal hypothesis. The arbiter may also include scoring subroutines that score skeletal hypotheses based on kinematics (static configuration of joints) and motion (state evolution over time). These subroutines penalize unlikely configurations of joints in a skeletal hypothesis (e.g., illegal joint angles or bone lengths) and unlikely transitions (e.g., unrealistically rapid acceleration).

Based on its scoring of the skeletal hypotheses from the experts, the arbiter outputs a best estimate of the correct skeletal configuration represented by the captured image of the user in the field of view (FOV). While the following description works with image capture of a field of view by a capture device, it is understood that the present technology may also be applied to capturing a scene comprised of fields of view from multiple capture devices. The experts and arbiter perform these functions for each frame of captured image data (or some other predefined repeating time period). In embodiments, the arbiter is inclusive of the skeletal hypotheses, maintaining all hypotheses as possible best outputs until it is required to output a single best hypothesis. In this way, skeletal hypotheses are eliminated from the solution set after analysis by all methodologies in the arbiter. The output of the arbiter may be used by a NUI system in a variety of ways, including animating an on-screen avatar of the user and/or determining whether a user has performed a specific known gesture. The output of the arbiter is also fed back into the pipeline as data for use in generating skeletal hypotheses for subsequent frames.

Figure 1B:
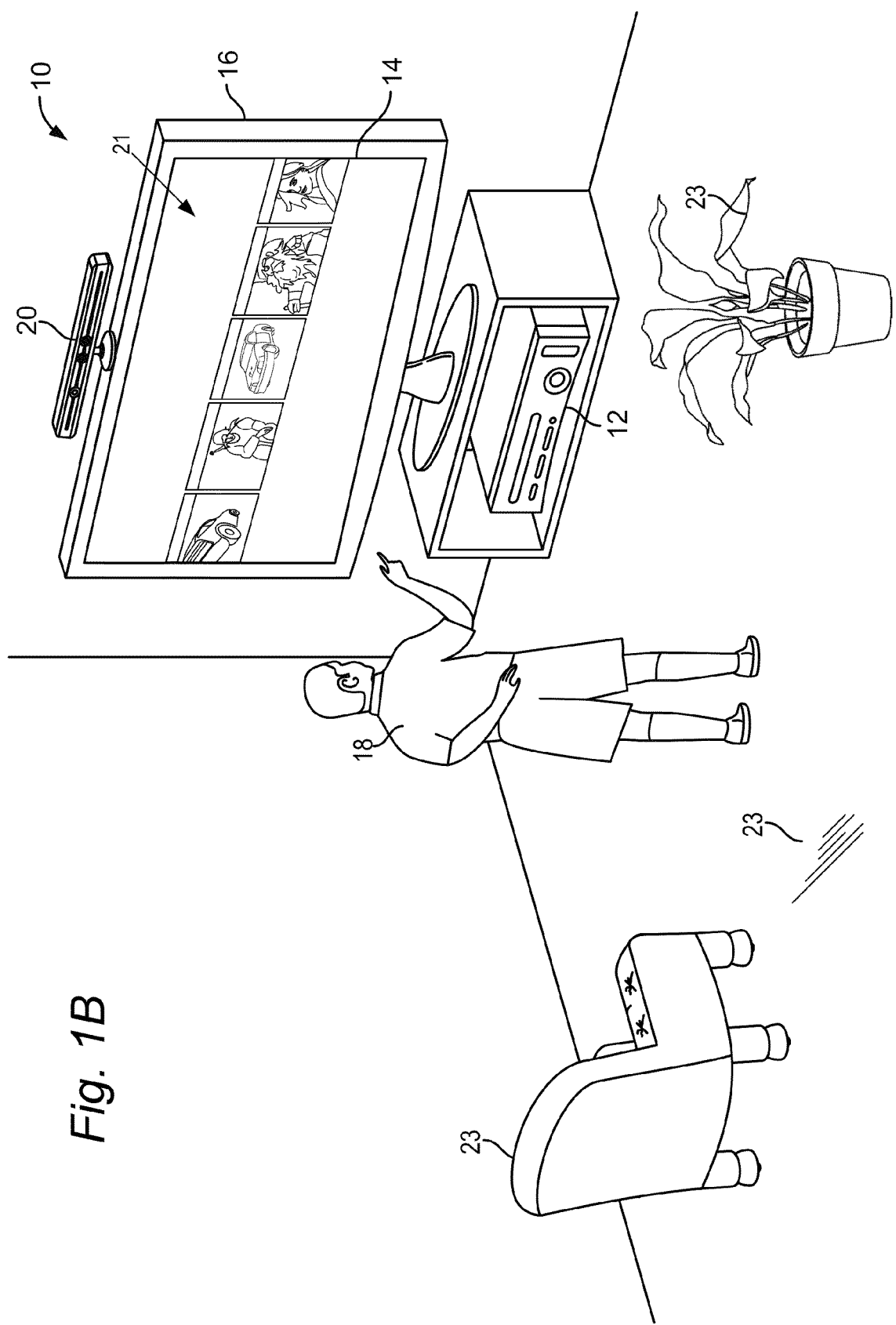
FIG. 1B illustrates a further example embodiment of a target recognition, analysis, and tracking system.
Figure 2:
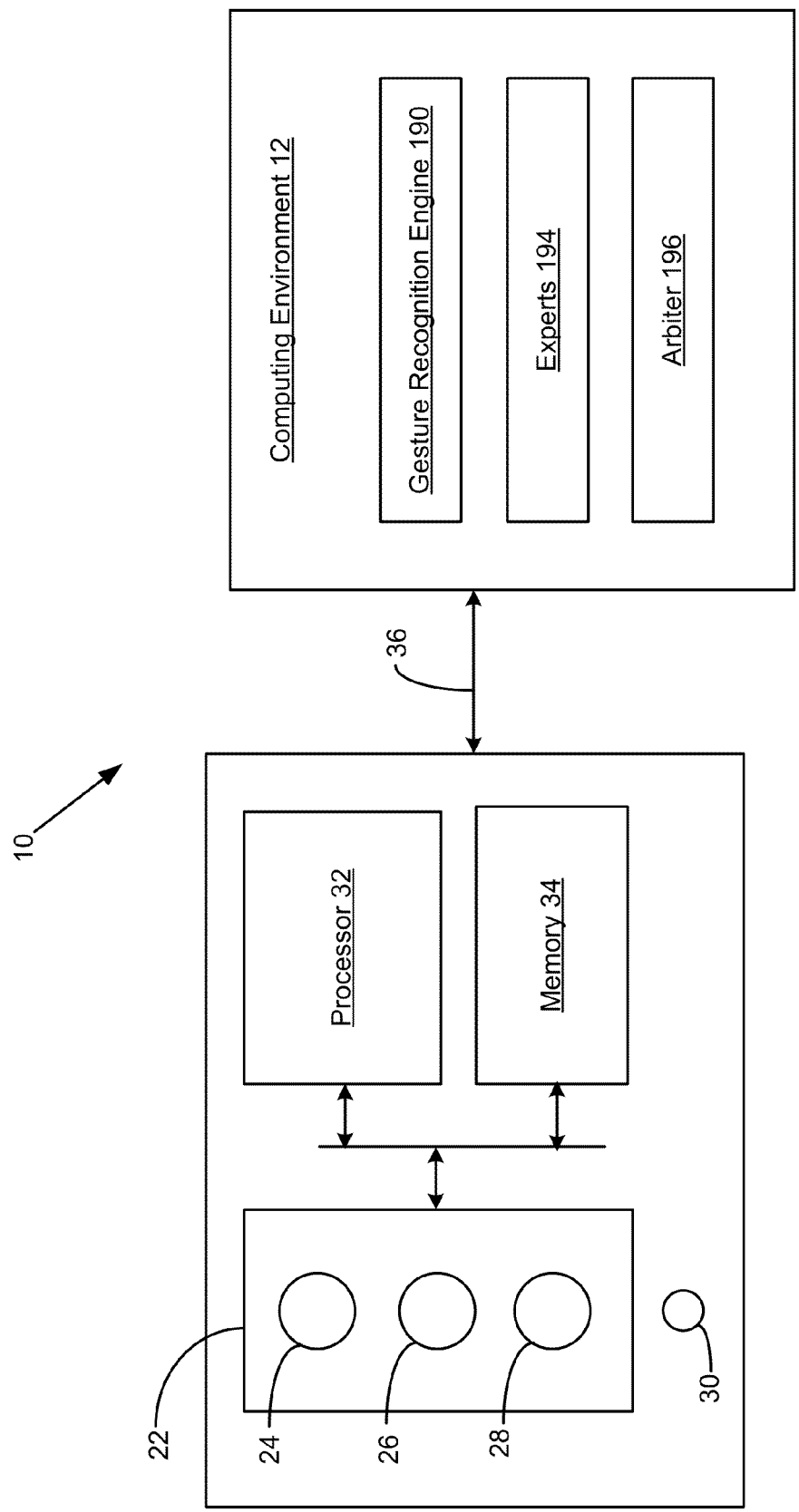
FIG. 2 illustrates an example embodiment of a capture device that may be used in a target recognition, analysis, and tracking system.

Referring initially to FIGS. 1A-2, the hardware for implementing the present technology includes a target recognition, analysis, and tracking system 10 which may be used to recognize, analyze, and/or track a human target such as the user 18. Embodiments of the target recognition, analysis, and tracking system 10 include a computing environment 12 for executing a gaming or other application. The computing environment 12 may include hardware components and/or software components such that computing environment 12 may be used to execute applications such as gaming and non-gaming applications. In one embodiment, computing environment 12 may include a processor such as a standardized processor, a specialized processor, a microprocessor, or the like that may execute instructions stored on a processor readable storage device for performing processes described herein.

The system 10 further includes a capture device 20 for capturing image and audio data relating to one or more users and/or objects sensed by the capture device. In embodiments, the capture device 20 may be used to capture information relating to partial or full body movements, gestures and speech of one or more users, which information is received by the computing environment and used to render, interact with and/or control aspects of a gaming or other application. Examples of the computing environment 12 and capture device 20 are explained in greater detail below.

Embodiments of the target recognition, analysis and tracking system 10 may be connected to an audio/visual (A/V) device 16 having a display 14. The device 16 may for example be a television, a monitor, a high-definition television (HDTV), or the like that may provide game or application visuals and/or audio to a user. For example, the computing environment 12 may include a video adapter such as a graphics card and/or an audio adapter such as a sound card that may provide audio/visual signals associated with the game or other application. The A/V device 16 may receive the audio/visual signals from the computing environment 12 and may then output the game or application visuals and/or audio associated with the audio/visual signals to the user 18. According to one embodiment, the audio/visual device 16 may be connected to the computing environment 12 via, for example, an S-Video cable, a coaxial cable, an HDMI cable, a DVI cable, a VGA cable, a component video cable, or the like.

In embodiments, the computing environment 12, the A/V device 16 and the capture device 20 may cooperate to render an avatar or on-screen character 19 on display 14. For example, FIG. 1A shows where a user 18 playing a soccer gaming application. The user's movements are tracked and used to animate the movements of the avatar 19. In embodiments, the avatar 19 mimics the movements of the user 18 in real world space so that the user 18 may perform movements and gestures which control the movements and actions of the avatar 19 on the display 14. In FIG. 1B, the capture device 20 is used in a NUI system where, for example, a user 18 is scrolling through and controlling a user interface 21 with a variety of menu options presented on the display 14. In FIG. 1A, the computing environment 12 and the capture device 20 may be used to recognize and analyze movements and gestures of a user's body, and such movements and gestures may be interpreted as controls for the user interface.

The embodiments of FIGS. 1A-1B are two of many different applications which may be run on computing environment 12, and the application running on computing environment 12 may be a variety of other gaming and non-gaming applications.

FIGS. 1A-1B include static, background objects 23, such as a floor, chair and plant. These are objects within the FOV captured by capture device 20, but do not change from frame to frame. In addition to the floor, chair and plant shown, static objects may be any objects picked up by the image cameras in capture device 20. The additional static objects within the scene may include any walls, ceiling, windows, doors, wall decorations, etc.

Suitable examples of a system 10 and components thereof are found in the following co-pending patent applications, all of which are hereby specifically incorporated by reference: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

FIG. 2 illustrates an example embodiment of the capture device 20 that may be used in the target recognition, analysis, and tracking system 10. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight. X and Y axes may be defined as being perpendicular to the Z axis. The Y axis may be vertical and the X axis may be horizontal. Together, the X, Y and Z axes define the 3-D real world space captured by capture device 20.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as a grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information. In another example embodiment, the capture device 20 may use point cloud data and target digitization techniques to detect features of the user.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28. With the aid of these devices, a partial skeletal model may be developed in accordance with the present technology, with the resulting data provided to the computing environment 12 via the communication link 36.

The computing environment 12 may further include a gesture recognition engine 190 for recognizing gestures as explained below. In accordance with the present system, the computing environment 12 may further include one or more experts 194 and an arbiter 196. The experts 194 are one or more software routines for generating skeletal hypotheses. The arbiter 196 is a software routine for analyzing the skeletal hypotheses and selecting a skeletal hypothesis estimated to be the best representation of a true skeletal configuration of the user captured by capture device 20. Portions of the experts 194 and arbiter 196 may be implemented in hardware, or a combination of a hardware and software. The experts 194 and arbiter 196 are explained in greater detail below.

Figure 3:
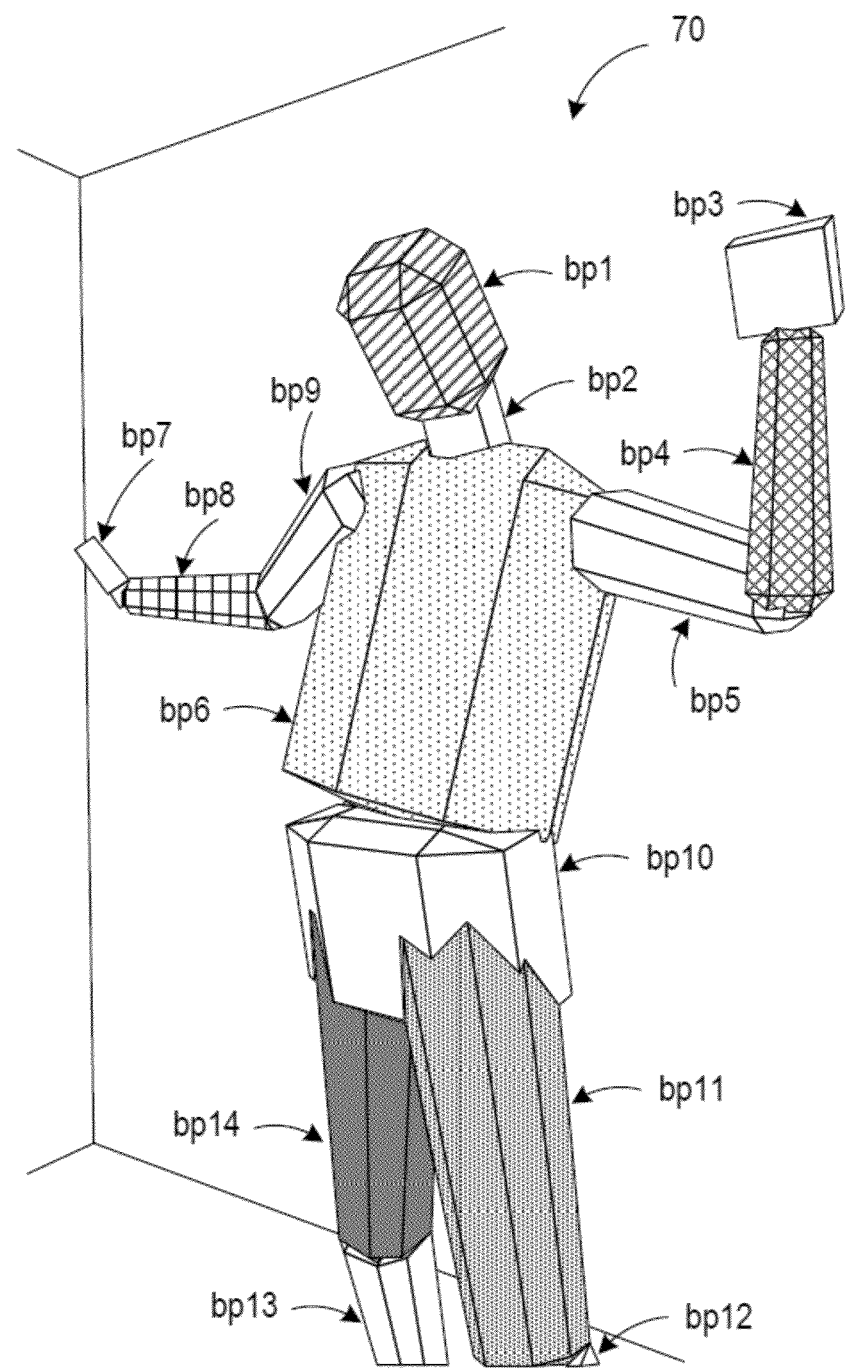
FIG. 3 shows an exemplary body model used to represent a human target.

FIG. 3 shows a non-limiting visual representation of an example body model 70. Body model 70 is a machine representation of a modeled target (e.g., game player 18 from FIGS. 1A and 1B). The body model may include one or more data structures that include a set of variables that collectively define the modeled target in the language of a game or other application/operating system.

A model of a target can be variously configured without departing from the scope of this disclosure. In some examples, a model may include one or more data structures that represent a target as a three-dimensional model including rigid and/or deformable shapes, or body parts. Each body part may be characterized as a mathematical primitive, examples of which include, but are not limited to, spheres, anisotropically-scaled spheres, cylinders, anisotropic cylinders, smooth cylinders, boxes, beveled boxes, prisms, and the like.

For example, body model 70 of FIG. 3 includes body parts bp1 through bp14, each of which represents a different portion of the modeled target. Each body part is a three-dimensional shape. For example, bp3 is a rectangular prism that represents the left hand of a modeled target, and bp5 is an octagonal prism that represents the left upper-arm of the modeled target. Body model 70 is exemplary in that a body model may contain any number of body parts, each of which may be any machine-understandable representation of the corresponding part of the modeled target.

A model including two or more body parts may also include one or more joints. Each joint may allow one or more body parts to move relative to one or more other body parts. For example, a model representing a human target may include a plurality of rigid and/or deformable body parts, wherein some body parts may represent a corresponding anatomical body part of the human target. Further, each body part of the model may include one or more structural members (i.e., "bones" or skeletal parts), with joints located at the intersection of adjacent bones. It is to be understood that some bones may correspond to anatomical bones in a human target and/or some bones may not have corresponding anatomical bones in the human target.

Figure 5:
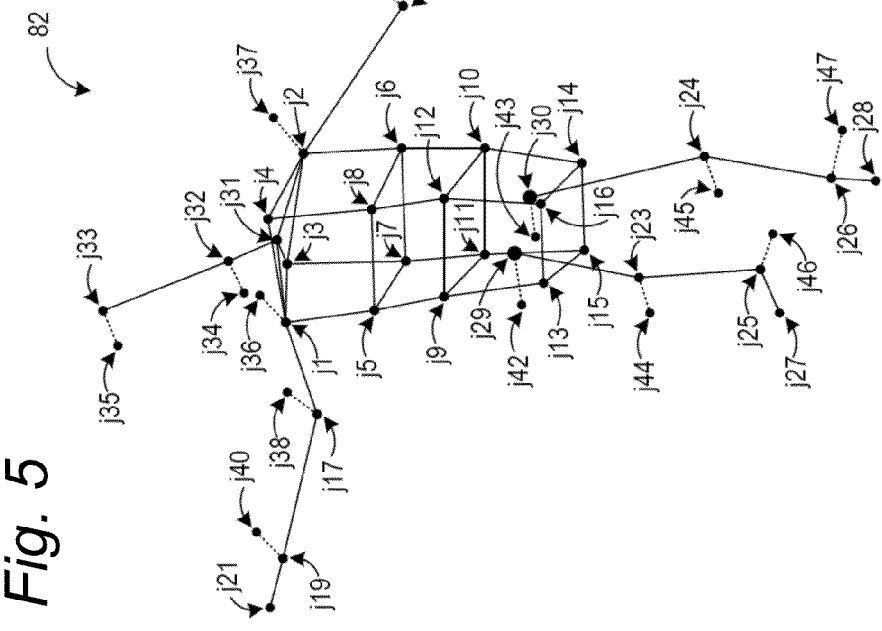
FIG. 5 shows a skewed view of an exemplary skeletal model used to represent a human target.
Figure 4:
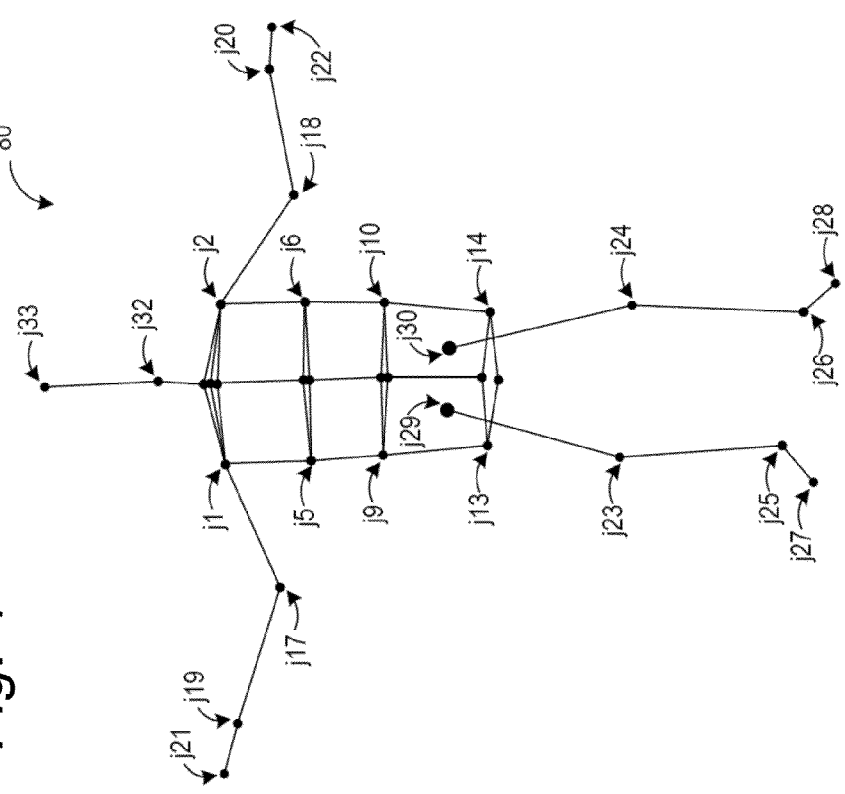
FIG. 4 shows a substantially frontal view of an exemplary skeletal model used to represent a human target.
Figure 7:
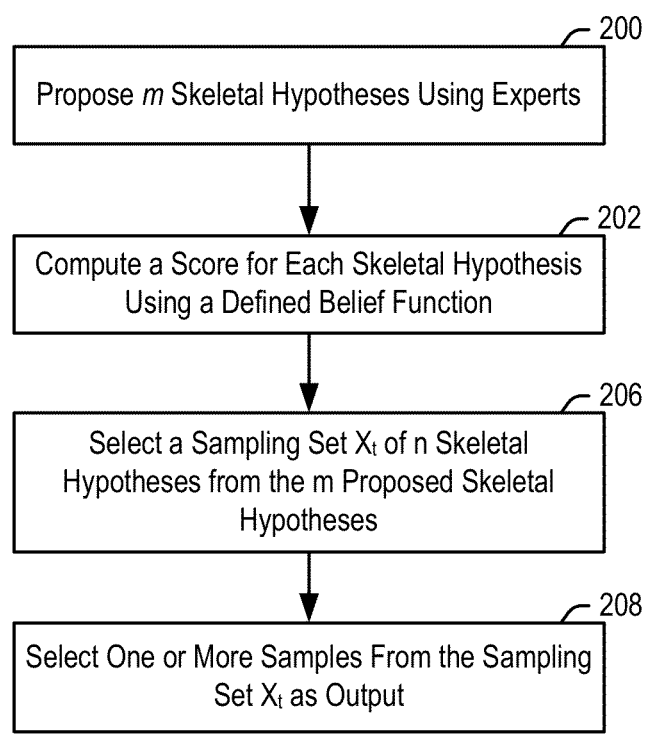
FIG. 7 is a flowchart of the high level operation of an embodiment of the present technology.

The bones and joints may collectively make up a skeletal model, which may be a constituent element of the body model. In some embodiments, a skeletal model may be used instead of another type of model, such as model 70 of FIG. 3. The skeletal model may include one or more skeletal members for each body part and a joint between adjacent skeletal members. Exemplary skeletal model 80 and exemplary skeletal model 82 are shown in FIGS. 4 and 5, respectively. FIG. 4 shows a skeletal model 80 as viewed from the front, with joints j1 through j33. FIG. 5 shows a skeletal model 82 as viewed from a skewed view, also with joints j1 through j33.

Skeletal model 82 further includes roll joints j34 through j47, where each roll joint may be utilized to track axial roll angles. For example, an axial roll angle may be used to define a rotational orientation of a limb relative to its parent limb and/or the torso. For example, if a skeletal model is illustrating an axial rotation of an arm, roll joint j40 may be used to indicate the direction the associated wrist is pointing (e.g., palm facing up). By examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

A skeletal model may include more or fewer joints without departing from the spirit of this disclosure. Further embodiments of the present system explained hereinafter operate using a skeletal model having 31 joints.

As described above, some models may include a skeleton and/or other body parts that serve as a machine representation of a modeled target. In some embodiments, a model may alternatively or additionally include a wireframe mesh, which may include hierarchies of rigid polygonal meshes, one or more deformable meshes, or any combination of the two.

The above described body part models and skeletal models are non-limiting examples of types of models that may be used as machine representations of a modeled target. Other models are also within the scope of this disclosure. For example, some models may include polygonal meshes, patches, non-uniform rational B-splines, subdivision surfaces, or other high-order surfaces. A model may also include surface textures and/or other information to more accurately represent clothing, hair, and/or other aspects of a modeled target. A model may optionally include information pertaining to a current pose, one or more past poses, and/or model physics. It is to be understood that a variety of different models that can be posed are compatible with the herein described target recognition, analysis, and tracking.

As mentioned above, a model serves as a representation of a target, such as game player 18 in FIGS. 1A and 1B. As the target moves in physical space, information from a capture device, such as depth camera 20 in FIGS. 1A and 1B, can be used to adjust a pose and/or the fundamental size/shape of the model in each frame so that it accurately represents the target.

FIG. 6 shows a flow diagram of an example pipeline 140 for tracking one or more targets. In embodiments, the target may be a human game player. While embodiments of the present technology are described below with respect to tracking a single target, the present technology may be used to track more than one target in further embodiments. Pipeline 140 may be executed by a computing system (e.g., computing environment 12) to track one or more players interacting with a gaming or other application. As introduced above, tracking of the players allows physical movements of those players to act as real-time user controls that adjust and/or control parameters of the gaming or other application. The gaming or other application making use of the information returned by the pipeline 140 is not critical to the present system, and the disclosed pipeline may be used to track human or nonhuman targets for a variety of other purposes.

The pipeline 140 can be used to accurately and efficiently track one or more humans that are present in the FOV of a depth camera (or several depth cameras). The pipeline can model and track one or more humans in real time, thus providing a responsive, immersive, and realistic experience for a human being tracked. Furthermore, the pipeline is believed to be efficient, so as to limit the computing resources used to execute the pipeline.

Pipeline 140 includes six conceptual phases: depth image acquisition 142, background removal 144, foreground pixel assignment 146, model fitting 148 (using the one or more experts 194), model resolution 150 (using the arbiter 196), and reporting an output 152. Depth image acquisition 142, background removal 144, and foreground pixel assignment 146 may all be considered as part of the preprocessing of the image data, also referred to herein as rasterization.

Depth image acquisition 142 may include receiving an observed depth image of a target within a FOV from depth camera 26 of capture device 20. The observed depth image may include a plurality of observed pixels, where each observed pixel has an observed depth value. The observed depth value includes depth information of the target as viewed from the source. The depth image may optionally be represented as a pixel matrix that includes, for each pixel address, a depth value indicating a world space depth from the plane of the depth camera, or another suitable reference plane, to a surface at that pixel address.

As shown at 154 of FIG. 6, depth image acquisition 142 may optionally include downsampling the observed depth image to a lower processing resolution. Downsampling to a lower processing resolution may allow the observed depth image to be more easily utilized and/or more quickly processed with less computing overhead. One example of downsampling is to group the pixels into patches in a technique occasionally referred to as oversegmentation. Patches may be chosen to have approximately constant depth, and roughly equal world-space area. This means that patches further from the camera appear smaller in the image. All subsequent reasoning about the depth image may be expressed in terms of patches, rather than pixels. As indicated, the downsampling step 154 of grouping pixels into patches may be skipped so that the pipeline works with depth data from individual pixels.

As shown at 156 of FIG. 6, depth image acquisition 142 may optionally include removing and/or smoothing one or more high-variance and/or noisy depth values from the observed depth image. Such high-variance and/or noisy depth values in the observed depth image may result from a number of different sources, such as random and/or systematic errors occurring during the image capturing process, defects and/or aberrations resulting from the capture device, etc. Since such high-variance and/or noisy depth values may be artifacts of the image capturing process, including these values in any future analysis of the image may skew results and/or slow calculations. Thus, removal of such values may provide better data integrity and/or speed for future calculations.

Background removal 144 may include distinguishing human targets that are to be tracked from non-target, background elements in the observed depth image. As used herein, the term "background" is used to describe anything in the scene that is not part of the target(s) to be tracked. The background may for example include the floor, chair and plant 23 in FIGS. 1A and 1B, but may in general include elements that are in front of (i.e., closer to the depth camera) or behind the target(s) to be tracked. Distinguishing foreground elements that are to be tracked from background elements that may be ignored can increase tracking efficiency and/or simplify downstream processing.

Background removal 144 may include assigning each data point (e.g., pixel) of the processed depth image a value, which may be referred to as a player index, that identifies that data point as belonging to a particular target or to a non-target background element. When such an approach is used, pixels or other data points assigned a background index can be removed from consideration in one or more subsequent phases of pipeline 140. As an example, pixels corresponding to a first player can be assigned a player index equal to one, pixels corresponding to a second player can be assigned a player index equal to two, and pixels that do not correspond to a target player can be assigned a player index equal to zero. Such player indices can be saved in any suitable manner. In some embodiments, a pixel matrix may include, at each pixel address, a player index indicating if a surface at that pixel address belongs to a background element, a first player, a second player, etc. The player index may be a discrete index or a fuzzy index indicating a probability that a pixel belongs to a particular target and/or the background.

A pixel may be classified as belonging to a target or background by a variety of methods. Some background removal techniques may use information from one or more previous frames to assist and improve the quality of background removal. For example, a depth history image can be derived from two or more frames of depth information, where the depth value for each pixel is set to the deepest depth value that pixel experiences during the sample frames. A depth history image may be used to identify moving objects in the foreground of a scene (e.g., a human game player) from the nonmoving background elements. In a given frame, the moving foreground pixels are likely to have depth values that are different than the corresponding depth values (at the same pixel addresses) in the depth history image. In a given frame, the nonmoving background pixels are likely to have depth values that match the corresponding depth values in the depth history image.

As one non-limiting example, a connected island background removal may be used. Such a technique is described for example in U.S. patent application Ser. No. 12/575,363, filed Oct. 7, 2009, the entirety of which is hereby incorporated herein by reference. Additional or alternative background removal techniques can be used to assign each data point a player index or a background index, or otherwise distinguish foreground targets from background elements. In some embodiments, particular portions of a background may be identified. For example, at 158 of FIG. 6, a floor in a scene may be identified as part of the background. In addition to being removed from consideration when processing foreground targets, a found floor can be used as a reference surface that can be used to accurately position virtual objects in game space, stop a flood-fill that is part of generating a connected island, and/or reject an island if its center is too close to the floor plane. A technique for detecting a floor in a FOV is described for example in U.S. patent application Ser. No. 12/563,456, filed Sep. 21, 2009, the entirety of which is hereby incorporated herein by reference. Other floor-finding techniques may be used.

Additional or alternative background removal techniques can be used to assign each data point a player index or a background index, or otherwise distinguish foreground targets from background elements. For example, in FIG. 6, pipeline 140 includes bad body rejection 160. In some embodiments, objects that are initially identified as foreground objects can be rejected because they do not resemble any known target. For example, an object that is initially identified as a foreground object can be tested for basic criteria that are to be present in any objects to be tracked (e.g., head and/or torso identifiable, bone lengths within predetermined tolerances, etc.). If an object that is initially identified as being a candidate foreground object fails such testing, it may be reclassified as a background element and/or subjected to further testing. In this way, moving objects that are not to be tracked, such as a chair pushed into the scene, can be classified as background elements because such elements do not resemble a human target. Where for example the pipeline 140 is tracking a target user 18, and a second user enters the FOV, the pipeline may take several frames to confirm that the new user is in fact human. At that point, the new user may either be tracked instead of or in addition to the target user.

After foreground pixels are distinguished from background pixels, pipeline 140 further classifies the pixels that are considered to correspond to the foreground objects that are to be tracked. In particular, at foreground pixel assignment 146 of FIG. 6, each foreground pixel is analyzed to determine what part of a target user's body that foreground pixel is likely to belong. In embodiments, the background removal step may be omitted, and foreground object determined other ways, for example by movement relative to past frames.

A variety of different foreground pixel assignment techniques can be used to assess which part of a player target's body, or a machine representation of the body, a particular pixel is likely to belong. In one of several possible embodiments, the body part proposal system runs Exemplar, which is a known technique for receiving a two-dimensional depth texture image and generating body part proposals as probabilities as to the proper identification of specific body parts within the image. In particular, each foreground pixel may be assigned a body part index and/or body part probability distribution. Exemplar analyzes a foreground object using information learned from a prior-trained collection of known poses. This approach can be used to assign each foreground pixel a body part index or distribution without any prior state information (i.e., knowledge of the prior frame is not needed). A variety of other stateless, machine-learning techniques may be employed for assigning pixels to different body parts with a given confidence.

Returning to FIG. 6, once depth image acquisition 142, background removal 144 and foreground pixel assignment 146 have been completed, the pipeline 140 performs model fitting 148 to identify skeletal hypotheses that serve as machine representations of a player target 18, and model resolution 150 to select from among these skeletal hypotheses the one (or more) hypotheses that are estimated to be the best machine representation of the player target 18. The model fitting step 148 is performed by the one or more experts 194 and the model resolution step 150 is performed by the arbiter 196. Further details of the one or more experts 194 and the arbiter 196 are now explained in greater detail with reference to the diagram of FIG. 7.

In general, the present system sets forth methods for tracking (i.e., estimating over time) the configuration of an articulated skeletal model by inferring, at time t, a state estimate vector $x_t$ which contains the three-dimensional position of every tracked point. In embodiments, the present system may track the location of 31 three-dimensional points, corresponding to locations on the human body, though it is understood that the present system may track greater or fewer points than that in further embodiments. Each point has three degrees of freedom in Cartesian space. Thus, in an embodiment tracking 31 points, the skeleton is fully specified by 93 values which may be represented at time step t as state estimate vector $x_t$.

In embodiments, the state estimate vector $x_t$ may be derived from different sources, including the depth data, denoted $\{z_1 \ldots z_t\}$, obtained as described above at every discrete time step. The state estimate vector $x_t$ may also come from historical knowledge of dynamic state data, denoted D. Specifically, D contains state estimate vector information about position and motion from prior frames, including for example likely configurations of joints, and likely trajectories of joint locations over time.

The output of any tracker is only an estimate; sometimes more accurate, sometimes less, but always with a degree of uncertainty. In light of this, a proposed state may be considered according to a belief of how good it is, represented by a probability distribution:

$$f(x_t) = P(\text{skelton now}|\text{all depth data and dynamics}) = P(x_t|z_1, \ldots, z_t, D)$$

The function $f(x_t)$, referred to herein as the belief function, assigns a probability score to a proposed state indicating how good it is; i.e., how closely it is believed to match the true state estimate vector $x_t$. The belief function $f(x_t)$ captures not only information about the likely state at a given time, but also about uncertainty. It may not be practical to consider the complete distribution $f(x_t)$ for all possible values of $x_t$. Instead, state estimation is approximated by a set of sampled skeletal hypotheses $X_t = \{x_t^{(1)} \ldots x_t^{(n)}\}$ where each hypothesis represents a machine representation of a skeleton that is plausible given the data. The accuracy of this approximation will improve as the number n of skeletal hypotheses increases. However, as n increases, so does the computational cost increase.

Thus, where a conventional tracking system may employ thousands of samples or more, the present system operates by selecting a small number of skeletal hypotheses, for example between 10 and 100 skeletal samples for $X_t$. There may be more or less samples in further embodiments. Given that embodiments of the system track a space which is 93-dimensional, this is a small number of samples. However, instead of selecting random samples, the system may employ experts 194, explained below, which make use of information including depth data $\{z_1 \ldots z_t\}$ and historical skeletal motion data D to improve the intelligence of the search for a set of proposed skeletal hypotheses.

Figure 8:
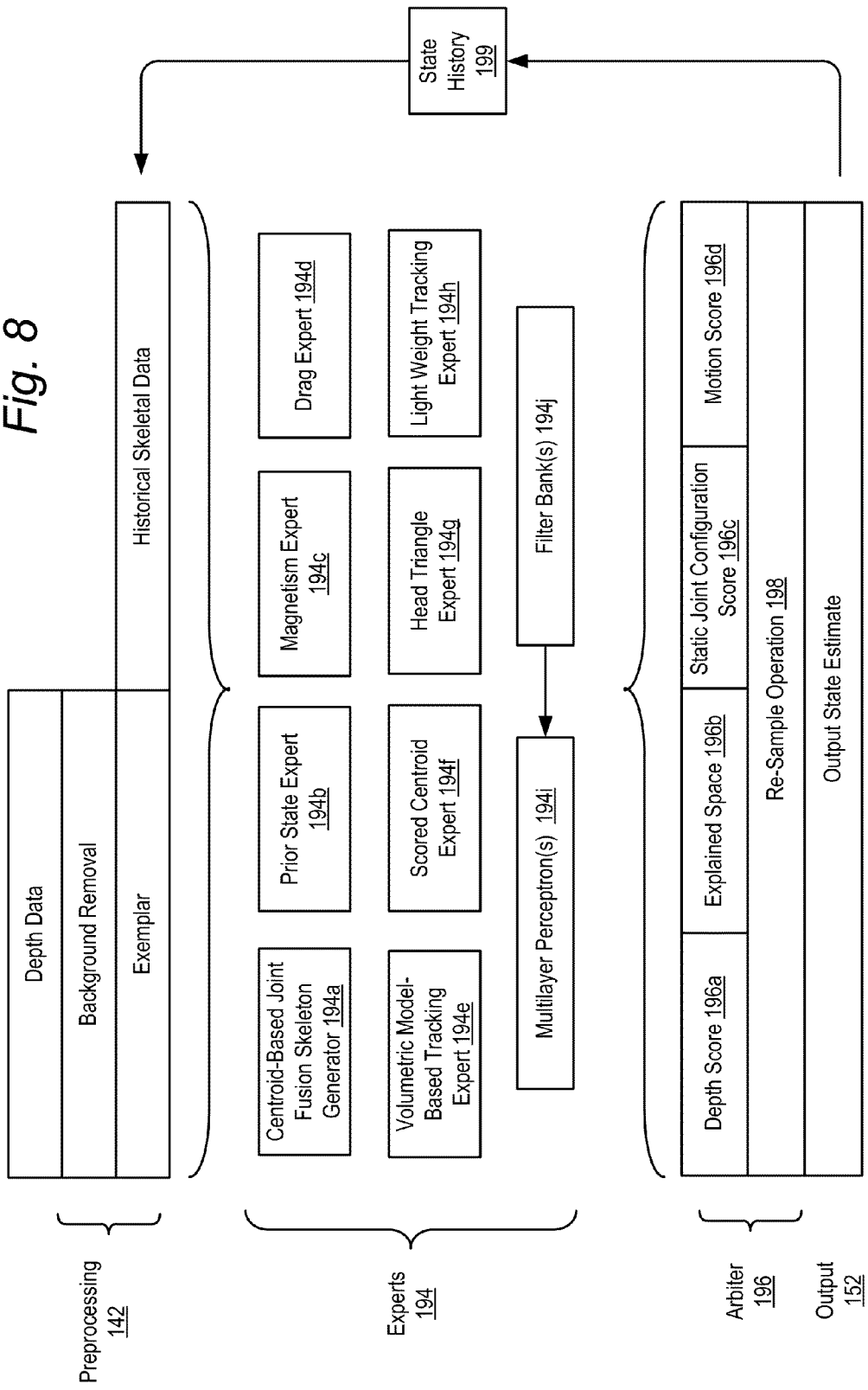
FIG. 8 is a stack diagram of the different layers of the pipeline of an embodiment of the present technology.

FIG. 8 is a flowchart of a high-level operation of an embodiment of the present system for obtaining a model (e.g., skeletal model 70 of FIGS. 3 and 4) of a user 18 for a given frame or other time period. As described above, in addition to or instead of skeletal joints, the model may include one or more polygonal meshes, one or more mathematical primitives, one or more high-order surfaces, and/or other features used to provide a machine representation of the target. Furthermore, the model may exist as an instance of one or more data structures existing on a computing system.

In step 200, the present system proposes m skeletal hypotheses, generated by experts 194 using some or all the available information. As indicated, these experts are selected based on their ability to provide good state estimates, at least some of the time. Next, in step 202, for each skeletal hypothesis, the arbiter 196 computes a score using the belief function $f(x_t)$.

In step 206, the set of n sampled skeletal hypotheses $X_t$ is filled from the m proposals of step 200. The probability that a given skeletal hypothesis may be selected into the sampled set $X_t$ is proportional to the score assigned by the arbiter in step 202. Thus, once steps 200-206 have been executed, expert proposals that were assigned a high probability by the arbiter are more likely to appear in the output set $X_t$ than proposals that were assigned a low probability. In this way $X_t$ will gravitate towards a good state estimate. One or more sample skeletal hypotheses from the sampled set $X_t$ (or a combination thereof) may then be chosen in step 208 as output for that frame of captured data, or other time period.

If the distribution in the sampled set $X_t$ does not indicate one or more estimates believed to closely match the state estimate vector $X_t$, this information may be returned instead of or in addition to one or more sample skeletal hypotheses from the set $X_t$. In particular, in embodiments, when the data given by the belief function $f(x_t)$ are unambiguous (the members of $X_t$ are similar to each other), this is a strong indicator that one or more of the sampled skeletal hypotheses are good indicators of the true state estimate vector $x_t$. However, there may also be situations in which there are numerous possibilities for (at least part of) the skeleton. For example, there may be two or more clusters within $X_t$, in which case it can be concluded that there is uncertainty between several distinct solutions. It may also happen that there is no coherence amongst the members of $X_t$. This is an indication that there is little certainty of the state and the system can act accordingly, knowing that the system was unable to produce any single estimate with confidence.

Referring now to FIG. 8, preprocessing layer 170 receives depth data, optionally removes a background of the FOV, and pixels are assigned to candidate body parts, using for example Exemplar. Each of these processes has been described above with respect to FIG. 6. The data from preprocessing layer 170 may be provided to the one or more experts 194. The experts 194 may also receive historical state estimates and/or motion prediction based on historical state estimates. In particular, in one embodiment, the previous frame output of the arbiter in identifying a best estimate of a machine representation of a skeletal configuration of a user is fed back to preprocessing layer 170 and used by one or more of the experts 194 in generating skeletal hypotheses for the current frame. In further embodiments, the output of two or more previous frames may be fed back to the preprocessing layer 170. In such embodiments, the experts may also interpolate or predict motion of one or more body parts of a user 18 based on a pattern of movement of the one or more body parts.

As noted above, the one or more experts 194 receive data from the preprocessing layer 170, and from that data, the one or more experts 194 generate a plurality of skeletal hypotheses that serve as machine representations of the player target. As noted above, the experts may generate a relatively small number of skeletal hypotheses. However, using the preprocessed data to arrive at estimates, the experts are able to provide one or more skeletal hypotheses generally providing a good approximation of user position. Some experts may be better at approximating a first position of a user, while other experts may be better at approximating a second, different position of the user. In addition to providing the skeletal hypotheses themselves, the group of skeletal hypotheses $X_t$ result in a probability distribution indicating a degree of confidence that one or more of the skeletal hypotheses represent the true position of body parts of the user.

The following describes some sample experts 194 which may be used in embodiments of the present system. In further embodiments, some of the following described sample experts may be omitted and/or other experts may be used instead of or in addition to the sample experts described below. While embodiments may use a plurality of experts, it is contemplated that a single expert 194 be used in further embodiments. Furthermore, experts 194 may be used in combination with each other. That is, the experts may be used in different layers, with the output from one or more experts used as the input for one or more further experts. In such embodiments, a given expert may be used in both a first layer, providing skeletal hypotheses or other data to a second layer, or in a second layer, receiving skeletal hypotheses or other data from a first layer.

Figure 9:
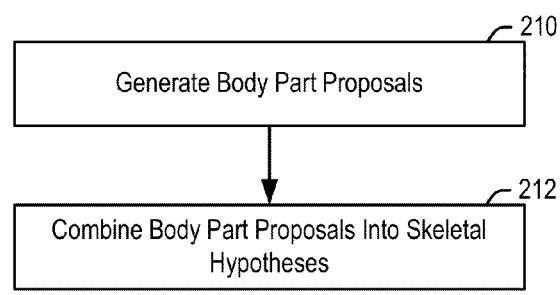
FIG. 9 is a flowchart of the operation of a first expert according to an embodiment of the present technology.

A first sample expert 194 is referred to as centroid-based joint fusion skeleton generator expert 194a. As indicated in the flowchart of FIG. 9, this expert generates skeletal hypotheses by first looking at body part proposals from the preprocessed data (step 210), and then combining the body part proposals into complete skeletons (step 212). In step 210, Exemplar's pixel-wise probability distributions are converted into centroid proposals for full, 93-dimensional, skeletons. Exemplar, which uses only local information in labeling a pixel, may be an unreliable source of global information about a single body part. For example, Exemplar may have difficulty distinguishing between the left and right hands. Centroid generation is a known technique for receiving Exemplar data of a two-dimensional depth texture image and generating numerous joint positions, with attached probabilities, from this data. For each body part, these joint positions identify multiple candidate locations for the specific body part within the image.

In embodiments, centroids are generated for each of the 31 points tracked, though again, there may be more or less than 31 tracked points in further embodiments. The various skeletal points may correspond to actual joints of a human target, terminal ends of a human target's extremities, and/or points without a direct anatomical link to the human target. Exemplar and centroid generation are just one example for identifying body parts in an image, and it is understood that any of a wide variety of other stateless (i.e., not based on past state estimates) methods may be used for producing body part location proposals. One or more centroid candidates may be calculated for each body part. That is, for each body part b $\in[1,31]$, the process generates $m_b \geq 0$ candidate locations for that part: $u_b^{(1)}, \ldots, u_b^{(m_b)}$.

It may happen that a good candidate joint was not proposed as input, either due to occlusion, failure in another subsystem, or some other problem. To handle this situation, the set of candidates for each joint is augmented with the "null" candidate $u_b^{(0)}$, corresponding to an "unknown" response. In the centroid-based joint fusion skeleton generator expert 194a, a null candidate is assigned a small, but non-zero, unary potential function value (explained below). This means there is a penalty for assigning a joint to null, but this may be selected if it releases the other joints in the model to form a better configuration.

Step 212 of the centroid-based joint fusion skeleton generator expert 194a involves forming a complete skeleton from the centroid data by selecting one candidate for each body part. To search over all possible combinations of candidates for good skeletons is prohibitively expensive. However, the centroid-based joint fusion skeleton generator expert 194a may use a function in which the joints of the skeleton are arranged as a tree structure, with the torso being the main trunk, and the joints of the head, arms and legs extending therefrom in a loopless fashion. In this way, it is possible to find one or more optimal skeletons (or a likely sample) with fast, polynomial-time dynamic programming. One example of dynamic programming uses the Viterbi algorithm, described for example in AJ Viterbi, "Error Bounds For Convolutional Codes And An Asymptotically Optimum Decoding Algorithm," *IEEE Transactions on Information Theory*, 13 (2): 260-269 (April 1967), which paper is incorporated by reference herein in its entirety. In general, given the constraint that candidates for good skeletons may be arranged as a loopless tree structure, the Viterbi algorithm describes a solution for finding an optimal, lowest cost connection of neighbor candidate centroids.

In particular, for each combination of 31 candidates, a probability may be assigned according to the following model:

$$f(x_t) = f(u_1 \ldots u_{31}) = \frac{1}{Z} \prod_{b=1}^{31} \Phi(u_b) \cdot \prod_{(i,j) \in N} \psi(u_i, u_j).$$

The unary potential, $\phi(u_b)$, is a weight for each candidate location for a part, derived from the Exemplar data used to generate it. N is the set of all pairs of body parts that are neighbors; e.g., the hand is connected to the wrist, the shoulder is connected to the chest and the upper arm, etc. Each pair of neighbors has a binary potential $\psi(u_i, u_j)$ weighting their relative position. This may be based on the distance between the points and how closely the distance matches an expected bone length. By choosing the members of the set N such that the connectivity of connected body parts graph has no loops, it is possible to efficiently obtain either the configuration that has the maximum probability, or to generate a sample from the probability distribution.

It is understood that algorithms other than the Viterbi algorithm may be used in the centroid-based joint fusion skeleton generator expert 194a. In one further example, a probability based belief propagation model may be used where random samples are taken from the probability distribution given by $f(x_t)$. Where the Viterbi algorithm provides an optimal solution, the probability based belief propagation model will find solutions at and near the optimal solution.

Figure 10A:
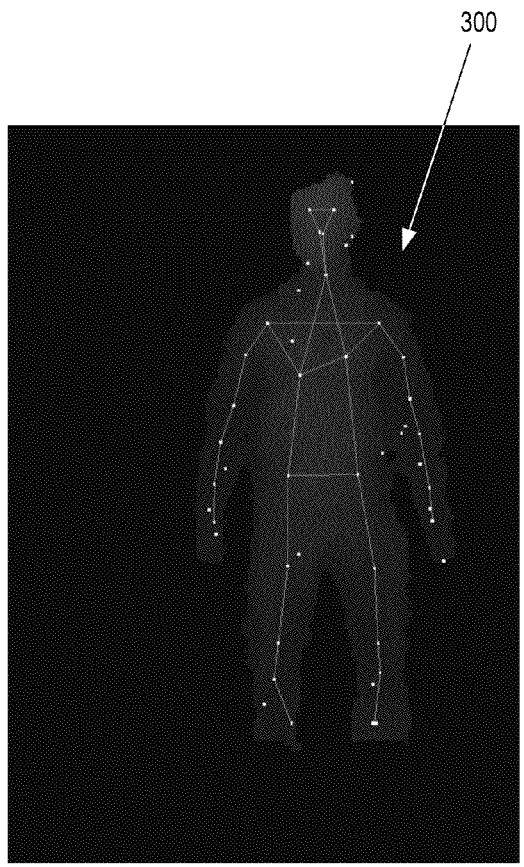
FIGS. 10A and 10B are images of two skeletal hypotheses generated with the first expert of a user in two different positions.
Figure 10B:
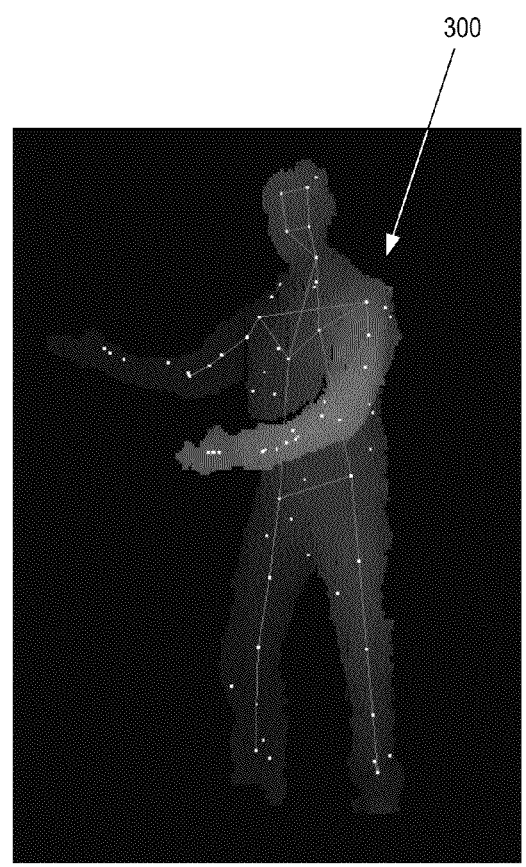

FIGS. 10A and 10B show a pair of sample skeletal hypotheses 300 derived from the centroid-based joint fusion skeleton generator expert 194a. The hypothesis of FIG. 10A is generated for a subject generally facing the capture device 20, where the hypothesis of FIG. 10B is generated for a subject turned to the side relative to the capture device 20. As can be seen, the centroid-based joint fusion skeleton generator expert 194a connects the points corresponding to candidate body parts output in step 210. In the example of FIG. 10B, the rear arm has parts assigned to null (and are therefore not rendered). The hand on the forward arm in FIG. 10B is also bent back at an unrealistic angle; by modeling only bone lengths, this particular model has no data to reason about angles such as shown. It is to be noted that this is just one proposal. Other samples from the model will connect the points differently. The skeletal hypotheses of FIGS. 10A and 10B are by way of example only, and any of a wide variety of other skeletal hypotheses may be generated by the centroid-based joint fusion skeleton generator expert 194a for different user positions.

The above-described expert made use of stateless (Exemplar) data. Further embodiments of experts may make use of stateful data, such as historical state estimate data. One such expert is the prior state expert 194b. As explained above, a goal of the present system is to arrive at a given state estimate vector $x_t$, for example each frame or other time period. Thus at a given time t, the state estimate vector from one or more prior frames, $x_{t-1}$, $x_{t-2}$, etc., may be available. From a random or complete sampling of the points identified at prior times, it is possible to infer skeletal hypotheses for the current time frame.

Figure 11:
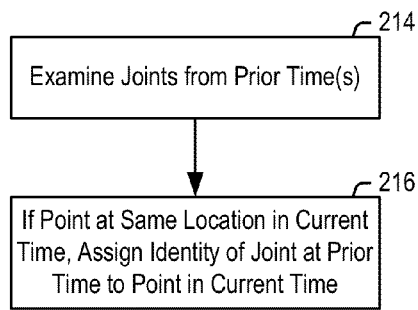
FIG. 11 is a flowchart of the operation of a second expert according to an embodiment of the present technology.

As shown in the flowchart of FIG. 11, one or more points from a prior time may be examined in step 214. It may happen that a joint tracked at a prior time is located at the same location (x, y and depth z) as a current point (as indicated by either the current depth map or new centroid. From this, the prior state expert 194b may infer that the points are the same, and in step 216, the identity of the joint at that location from the past is assigned to the point at that location in the present.

Figure 12:
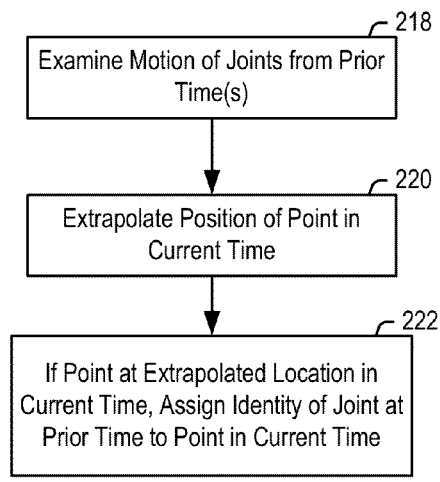
FIG. 12 is a flowchart of the operation of the second expert according to a further embodiment of the present technology.

Moreover, as shown in the flowchart of FIG. 12, it may happen that the position of a point at the current time period may be interpolated given the motion of a joint tracked over two or more prior time periods (steps 218 and 220). If a point is found in the current time at that interpolated position in step 222 (indicated by either the current depth map or new centroid), the prior state expert 194b may infer the point at the interpolated position is the same joint identified in the prior time periods. Using the processes of FIGS. 11 and 12, the prior state expert 194b may be able to determine one or more skeletal hypotheses.

Figure 13A:
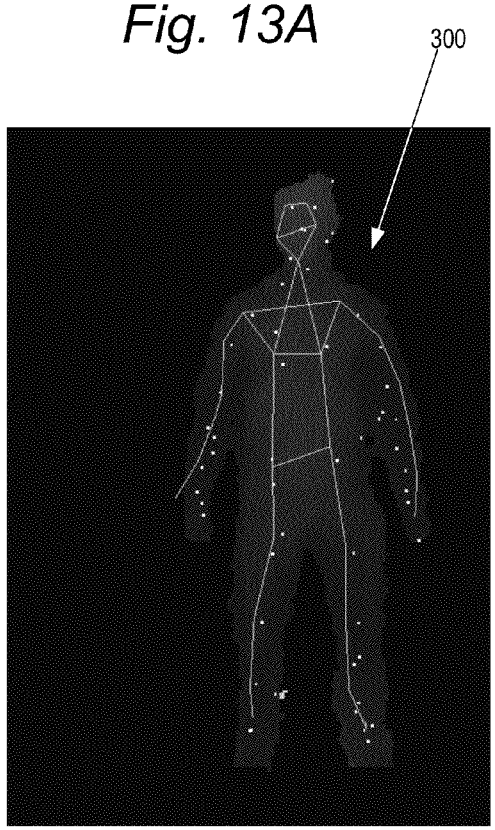
FIGS. 13A and 13B are images of two skeletal hypotheses generated with the second expert of a user in two different positions.
Figure 13B:
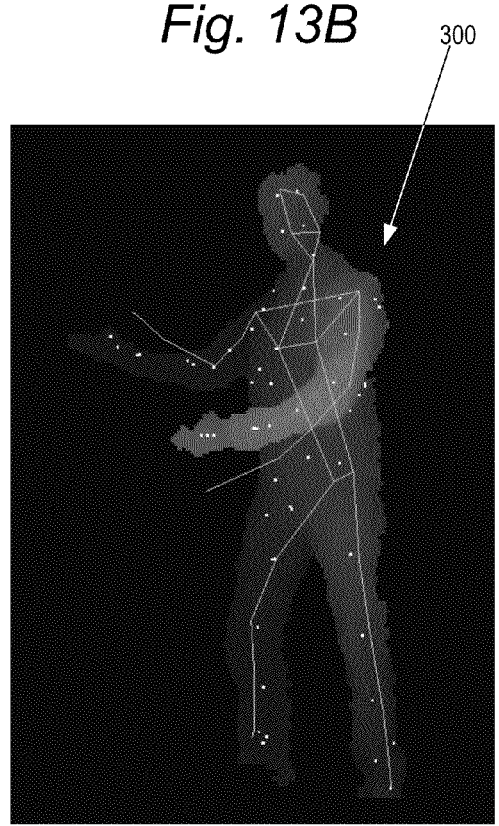

Examples of two skeletal hypotheses 180 determined by the prior state expert 194b are shown in FIGS. 13A and 13B. The hypotheses of FIGS. 13A and 13B are generated from the same user 18 modeled in the hypotheses 300 in FIGS. 12A and 12B, respectively. Based on motion alone (it has not used any information from the Exemplar or depth image), one can see how it correctly predicts the location of some body parts, but incorrectly predicts others. Again, multiple such skeletal hypotheses are generated, and other samples from the model will connect the points differently in the prior frame. The skeletal hypotheses of FIGS. 13A and 13B are by way of example only, and any of a wide variety of other skeletal hypotheses may be generated by the prior state expert 194b for different user positions.

A slight variation on prior state expert 194b is magnetism expert 194c. It may happen that an identified point at time t is near to a point with the same identification found at t−1. In this case, the magnetism expert 194c may snap the point identified at the prior time to the current position. Magnetism involves the concept of "snapping" the location of a skeletal feature (such as a hand) from a previous frame or frames onto a new depth map. For example, if a left hand was identified for a user in a previous frame, and that hand is isolated (not touching anything), magnetism can accurately update that hand's location in the current frame using the new depth map. Additionally, where a hand is moving, tracking the movement of that hand over two or more previous frames may provide a good estimation of its position in the new frame.

This predicted position can be used outright as a hand proposal (as provided by the prior state expert 194b). Additionally or alternatively, this predicted position can be snapped onto the current depth map, using the magnetism expert 194c, to produce another hand proposal that better matches the current frame. This snapping of a prior joint location to an updated location may be performed on a plurality of joints, and the magnetism expert 194c and prior state expert 194b may generate a plurality of skeletal hypotheses, either singly or working in combination with each other. The snapping to an updated location may also be based on a point just beyond an extremity such as a hand. This feature is explained in U.S. patent application Ser. No. 12/825,657, entitled, "Skeletal Joint Recognition And Tracking System,", filed Jun. 29, 2010, which application is incorporated by reference herein in its entirety.

A corollary to the magnetism expert 194c is the drag (or "relax") expert 194d. Where a previous frame used magnetism to snap a joint to a new location, there may be another joint or joints attached upstream of the snapped joint for which there may not be fresh data. In such an event, the attached upstream joint or joints without good data may be dragged along with the snapped joint to a new position. This new position will vary depending on where the snapped joint moved to and the position of a joint upstream of the joint to be dragged. The drag expert 194d may also be used with other experts. In particular, where another expert repositioned a joint relative to a prior frame, and there is an upstream joint without good data attached to the repositioned joint, the drag expert 194d may be used to reposition the upstream joint. Apart from dragging upstream joints, the drag expert 194d may provide one or more skeletal hypotheses for example in the same manner as the centroid-based joint fusion skeleton generator expert 194a or prior state expert 194b described above. It is understood that other methods may be provided to determine updated data for joints that are upstream of a repositioned joint.

As noted above, it may happen that a given joint was not identified either due to occlusion, failure in another subsystem, or some other problem. The centroid-based joint fusion skeletal generator 194a handled this situation with a null candidate. Volumetric model-based tracking expert 194e is a further example of an expert where missing joints and other body parts may be "grown." That is, where there is no good Exemplar and/or historical data for an intermediate joint or an extremity, the neighboring joints and depth data may be examined to interpolate the data for the missing body part to, in effect, grow the body part.

A system for generating one or more skeletons, including growing body parts, that can be used in the volumetric model-based tracking expert 194e is disclosed in U.S. patent application Ser. No. 12/363,604, entitled "Visual Target Tracking," filed on 30 Jan. 2009, which application is incorporated by reference herein in its entirety. However, in general, in one embodiment, missing joint data may be grown using the body-part/player index stored for each pixel, described above with respect to FIG. 6. The growth expert may begin by searching for pixels having neighboring pixels with a different body-part/player index. These may be considered "edge" pixels, i.e., frontiers along which values may optionally be propagated. Growing the pixel values may include growing into either "unknown" or "known" pixels. For "unknown" pixels, the body-part/player index value, for example, may have been zero before, but may now have a non-zero neighboring pixel. In such a case, the four direct neighboring pixels may be examined, and the neighboring pixel having an observed depth value more closely resembling that of the pixel of interest may be selected and assigned to the pixel of interest.

In the case of "known" pixels, it may be possible that a pixel with a known nonzero body-part/player index value may be overtaken, if one of its neighboring pixels has a depth value written during rasterization that more closely matches the observed depth value of the pixel of interest than that of the synthesized depth value for that pixel.

Additionally, for efficiency, updating a body-part/player index value of a synthesized pixel may include adding its neighboring four pixels to a queue of pixels to be revisited on a subsequent pass. As such, values may continue to be propagated along the frontiers without doing an entire pass over all the pixels. As another optimization, different N×N blocks of pixels (e.g., 16×16 blocks of pixels) occupied by a target of interest can be tracked so that other blocks that are not occupied by a target of interest can be ignored. Such an optimization may be applied at any point during the target analysis after rasterization in various forms. The concept of grouping together pixels into an N×N block of pixels may also be used in the other experts 194 described herein.

The volumetric model-based tracking expert, as well as the other tracking features described in U.S. patent application Ser. No. 12/363,604 incorporated above can be used as another expert in this system, producing whole skeletons. Alternatively or additionally, the volumetric model-based tracking expert, as well as the other tracking features described in U.S. patent application Ser. No. 12/363,604 incorporated above can also be used to shore up the output of other experts. The pixel/body part growing technology features described in U.S. patent application Ser. No. 12/363,604 incorporated above may also be used to find new body parts that would be useful to other experts.

The above is one example of how joint data for missing joints may be grown. Apart from growing data for missing joints, the body part growth expert 194*e* may provide one or more skeletal hypotheses for example in the same manner as the centroid-based joint fusion skeleton generator expert 194*a* described above. It is understood that other methods may be provided to grow, interpolate, fix or otherwise provide data for missing joints.

A further expert is referred to herein as the scored centroid expert 194*f*. Details of the scored centroid expert 194*f* are set forth in the above-referenced U.S. patent application Ser. No. 12/603,437, entitled "Pose Tracking Pipeline." However, in general, the scored centroid expert 194*f* operates by generating scored centroids for body parts. The scores applied to centroids may be adjusted based on one or more constraints including prior state data and the depth map. It may happen using scored centroid expert 194*f* (or other centroid-based experts) that one or more of the new centroids may belong to body parts of a second user within the FOV. This may result in a skeletal hypothesis for a target user that includes body parts from other users. Again, multiple such skeletal hypotheses are generated using the various experts 194, and other samples from the model will connect the points differently.

The centroid-based joint fusion skeleton generator expert 194*a* makes use of a generalized tree structure of a human body in generating skeletal hypotheses. Further experts may make use of other known human body configurations in generating further skeletal hypotheses. One such expert is referred to herein as head triangle expert 194*g*. An example of a system which generates skeletal hypotheses using head triangles is described in U.S. patent application Ser. No. 12/825,657, previously incorporated by reference. In general, head triangle expert 194*g* forms candidate head triangles from one head centroid connected to two shoulder centroids from the group of head and shoulder centroids identified by Exemplar from the image data. In general, Exemplar provides strong head and shoulder signals for users, and this signal becomes stronger when patterns of one head and two shoulder centroids may be found together. Head and/or shoulder centroids may come from any number of sources other than Exemplar/centroids, including for example head magnetism and simple pattern matching.

In some instances, one joint may be occluded. For example, the left shoulder may be occluded but the head and right shoulder are visible (although again, it is not yet known that it is the left shoulder which is occluded). The head and right shoulder may also have moved, for example to the right by an average of 3 mm, relative to a previous frame. In this case, an extra candidate triangle would be constructed with the left shoulder also moving to the right by 3 mm (rather than dragging where it was, or mistakenly jumping to a new place), so that the triangle shape is preserved (especially over time), even though one of the joints is not visible for some time.

Once a head triangle for a target is constructed, skeletal hypotheses may then be generated for the rest of the body. In embodiments, skeletal hypotheses may be generated for less than the entire body. For example, a target user's upper body may be modeled, a target user's lower body may be modeled, a target user's left side may be modeled, and/or a target user's right side may be modeled.

Where entire body skeletal hypotheses are generated, the head triangle expert 194*g* may use the one or more identified head triangles and additional centroid and/or magnetism data to construct the remainder of each skeletal hypothesis. For example, the head triangle expert may next identify left and right hands from the centroid data, and a number of possible elbow positions that fit each shoulder/hand pair. The head triangle expert may also select torso centroids, hip centroids, and feet centroids. The system may then select a number of possible knee positions that fit each hip/foot pair. In this way, the head triangle expert 194*g* may generate a number of skeletal hypotheses that may be evaluated by the arbiter as explained below.

Another expert 194 making use of the generally known structure of a human body is light weight tracking expert 194*h*. Further details of a skeletal model generator which may be used as light weight tracking expert 194*h* are disclosed in U.S. application Ser. No. 12/575,388 entitled, "Light Weight Human Tracker,", filed Oct. 7, 2009, which application is incorporated herein by reference in its entirety. However, in general, the light weight tracking expert 194*h* may operate effectively for front-facing targets by identifying a reference position within the torso of a model, and then constructing a box around the torso, referred to as a torso volume. The torso volume may in general be constructed by searching the depth data right, left, up, down and diagonally from the reference position until a pixel is identified at a different depth than the torso. The torso volume around the torso may be identified by other methods.

The light weight tracking expert 194*h* may then identify the positions of the head, arms and legs for one or more skeletal hypotheses. This may be accomplished by a variety of methods, used alone or in combination with each other. In one example, centroids for the head, arms and legs having appropriate relation to the torso volume may be used to form skeletal hypotheses. In a further example, prior state data identifying the positions of the head, arms and legs from a prior frame may be used. The prior state data may be the position of the head and/or limbs in a depth image received in a previous frame, a projected body part location or position based on a previous movement. The prior state data may further be any other suitable previous location or position of a representation of a human target such as a fully articulated skeleton or volumetric model of the human target. For example, the light weight tracking expert 194*h* may compare the position or location including the X-value, Y-value, and depth value of points outside of the torso volume with the previous positions including the X-values, Y-values, and depth values of the previously identified head and/or limbs such as the previously identified left arm, right arm, left leg, right leg, or the like. The light weight tracking expert 194*h* may then associate each of the points outside the torso volume with the previously identified limb that may have the closest position based on the comparison.

The above description of experts 194*a* through 194*h* is by way of example only. It is understood that embodiments of the present system may operate without one or more of the experts 194*a* through 194*h*. Moreover, it is understood that a variety of other computationally inexpensive tracking algorithms may be used as experts 194 in addition to or instead of experts 194a through 194h to form one or more skeletal hypotheses in further embodiments.

Moreover, one or more of the experts 194a through 194h may be combined with each other or other experts, in various combinations. In one such example, any of the centroid-based experts described above (or other stateless techniques) may be combined with any of the magnetism-based or motion-based experts described above (or other stateful techniques) to provide an expert which forms one or more skeletal hypotheses based on both stateless and stateful techniques. An example of a system which generates skeletal hypotheses in such a way is described in U.S. application Ser. No. 12/825,657, incorporated above. Other stateless and stateful experts 194 may be used in combination with each other in further embodiments.

In embodiments, one or more neural networks may also be used as experts. While a variety of such neural networks are contemplated, an example may include one or more multilayer perceptrons 194i. A multilayer perceptron is an example of a known neural network, and it may be used as a standalone expert, or it may be used in conjunction with one or more of the above-described experts to derive further or alternative experts.

In general, the multilayer perceptron 194i is computationally inexpensive to run and a number of them can be run within the available timeframe. Multilayer perceptrons 194i in general have a relatively small input set, such as for example centroids, previous state data and/or the output of other experts from the same frame (in which case the neural network expert would be considered a downstream expert). These inputs are processed through matrix multiplication using a relatively small number of layers to arrive at one or more output skeletal hypotheses. While possibly burdensome to train, once trained, the one or more multilayer perceptrons 194i are inexpensive to run. A benefit of this is that a number of multilayer perceptrons 194i can be used, each trained to excel at a specific task, for example detecting specific joint positions and body poses.

One example of a multilayer perceptron 194i which may be implemented to generate skeletal hypotheses is a kinematic projection neural network. In particular, as noted above, the present system may track 31 body parts, or some other number n, each theoretically having 3 degrees of freedom. However, in reality, given constraints on how body parts may move relative to each other, there would in fact be fewer than 3n degrees of freedom. A kinematic neural network takes the n body parts that are tracked, and, using the trained kinematic constraints on the degrees of freedom and how a body can move, it maps the n body parts into one or more skeletal hypotheses which fit the constraints of the kinematic neural network. As described above, several different kinematic projection neural networks may be provided, each specialized to detect a specific pose or poses of the user.

In embodiments, a multilayer perceptron 194i may be used by itself, or it may be combined with one or more filter banks 194j to form a so-called deep neural network or convolutional neural network. As is known, the filter bank 294j may include weighted kernels for receiving large input sets of data, for example each pixel in an image depth map. The weighted kernels of the filter bank process the input data into a condensed and rich format which may then be passed as input to the multilayer perceptron 194i. The filter banks 194j may be trained together with the multilayer perceptron 194i, for example by back propagation, in a known manner to generate one or more skeletal hypotheses, either by themselves or in combination with one or more other experts 194.

There may be a separate multilayer perceptron 194i (by itself or receiving output from a filter bank 194j) for any of a variety of poses. Thus, for example, one multilayer perceptron may be specifically directed to recognizing a body pose where the user is in profile (i.e., the user is turned 90° from the capture device 20). This particular neural network may not generate accurate skeletal hypotheses for user poses where the user is facing the capture device, but will generate skeletal hypotheses with a high degree of confidence when a user is in profile. Other multilayer perceptrons may be provided which accurately identify a user pose where the user is facing the capture device 20.

As indicated above, the multilayer perceptron 194i (by itself with the filter bank 194j) may be combined with one or more of the above-described experts (or other neural networks). In further embodiments, it is contemplated that any of the above-described experts may be combined with any other above-described expert, so that the output of one expert (an upstream expert) may be fed as input to another expert (a downstream expert). A given expert may be both an upstream expert in one embodiment and a downstream expert in another embodiment. Moreover, the present system may further comprise the concept of a "mixer" expert, which lives downstream of the other experts, and consumes all of their output, mixing and matching from various skeletal hypotheses. The output of the mixer expert may be skeletal hypotheses having head, torso and limbs possibly resulting from different experts. For example, a skeletal hypothesis from the mixer expert may have a left arm from centroid-based joint fusion skeleton generator 194a and a right leg from magnetism expert 194c. In embodiments the mixer expert may work through different experts one limb at a time, or it may work through different experts for complete skeletal hypotheses and then mix and match different limbs, making a best guess as to which expert has the best guess as to each limb or other division of body parts.

In general the experts, including for example the various experts 194 described above, generate one or more skeletal hypotheses in a computationally inexpensive manner. These skeletal hypotheses are then evaluated by the arbiter 196 to identify the one or more skeletal hypotheses believed to best represent the user position for a given frame or other time period. As noted, the skeletal hypotheses may be distributed in such a manner that the arbiter is unable to pick out one or more best skeletal hypotheses. This information is also passed on to the pipeline 140. The arbiter 196 is explained below in greater detail.

In general, the arbiter 196 evaluates the one or more skeletal hypotheses, using different methodologies. The first two methodologies test how well a skeletal hypothesis matches the depth data, firstly by measuring whether points in the proposal exist in the data (depth score 196a), and secondly by testing how completely the skeletal hypothesis explains the available data (explained space 196b). The arbiter 196 also includes methodologies that score skeletal hypotheses based on kinematics (static joint configuration score 196c) and motion (motion score 196d). Each of these methodologies is explained below. In embodiments, the arbiter may further use data from a game or other application running on the computing environment 12 as to what action (user pose) is expected. These methodologies are by way of example only, and arbiter 196 may evaluate skeletal hypotheses to arrive at a best guess of the state estimate by other methodologies in further embodiments.

Using the depth score 196a, the arbiter 196 evaluates whether the position of each joint described by a skeletal hypothesis is supported by the measured depth data. A disparity between a skeletal hypothesis joint and the measured depth data does not remove that skeletal hypothesis from consideration. Rather, it negatively impacts a score associated with the tested skeletal hypothesis. The comparison of all joints against the depth data will result in a cumulative score for the depth score 196a.

Figure 14:
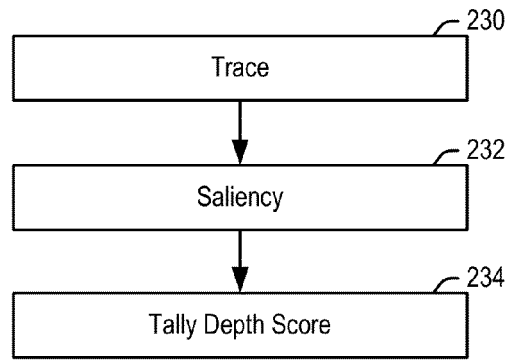
FIG. 14 is a flowchart of the operation of a first methodology of the arbiter according to an embodiment of the present technology.

Referring to the flowchart of FIG. 14, the depth score 196a may be characterized by two tests referred to as the trace and saliency steps 230 and 232. Trace step 232 involves taking trace samples along lines known to be within the body for a large variety of users, and which evenly occupy the interior space. In embodiments, the samples may fill in a minimum silhouette of a person.

For trace samples, good Z-matches (where the depth value and the measured joint of the skeletal hypothesis are similar) result in rewards, and bad Z-matches result in penalties. The closeness of the match/severity of the mismatch can affect the amount of penalty/reward, and positive vs. negative mismatches may be scored differently. For matches, a close match will score higher than a weak match. Drastic mismatches are treated differently based on the sign of the difference: if the depth map sample is further than expected, this is a 'salient' sample and incurs a harsh penalty. If the depth map sample is closer than expected, this is an 'occlusion' sample and incurs a mild penalty. In some embodiments, the expected Z values are simply interpolated between the depths of the candidate body part locations. In other embodiments, the expected Z values are adjusted to compensate for common non-linear body shapes, such as the protrusion of the chin and face, relative to the neck and shoulders. In other embodiments, which begin with other parts of the skeleton, similar interpolation and adjustment of the expected Z values can be made.

Figure 15:
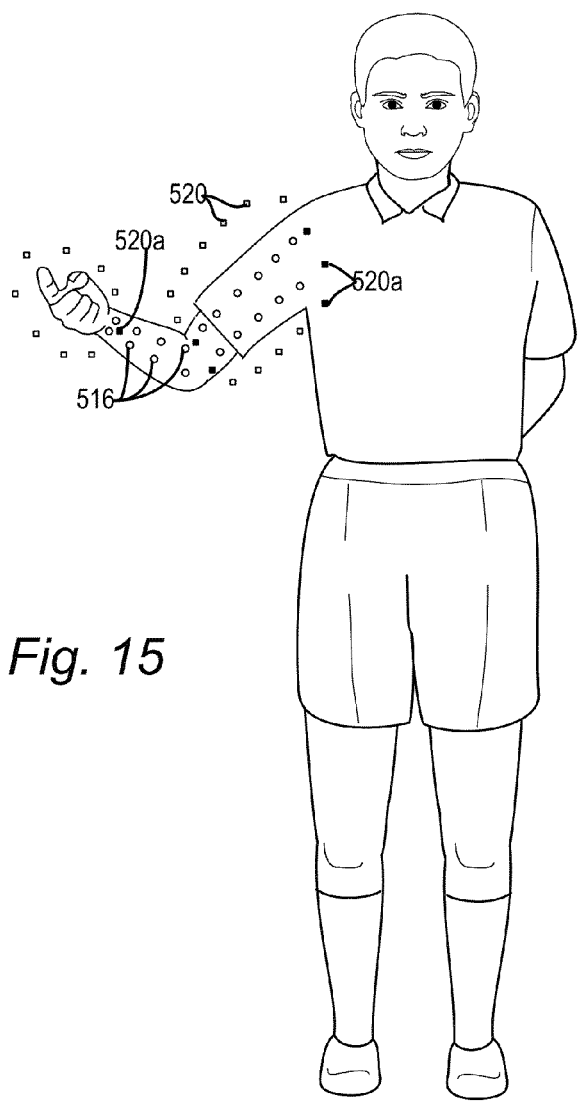
FIG. 15 is an image of samples taken according to the trace and saliency tests of the first methodology of the arbiter according to an embodiment of the present technology.
Figure 16:
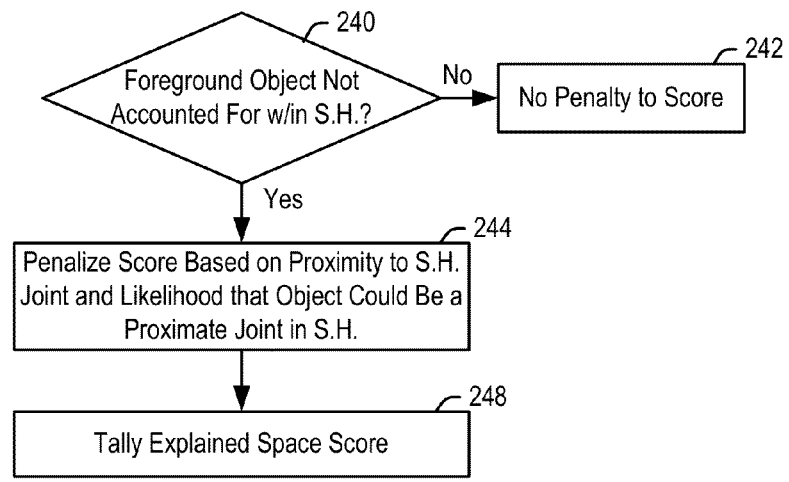
FIG. 16 is a flowchart of the operation of a second methodology of the arbiter according to an embodiment of the present technology.

FIG. 15 shows an example of trace samples 516 for a portion (hand, arm and shoulder) of a body defined by a given of a skeletal hypothesis. The trace samples 516 may be defined at a radius along the center line of the upper and lower arms. The radius is set small enough so as to guarantee that the samples are within the target's upper and lower arm, even for users with narrow arms. Once the trace samples are defined, the depth of the trace samples is then examined. If an individual sample has a bad z mismatch with the depth map, then that trace sample gets a bad score. The scores from all samples may be tallied for the resulting score.

The saliency test in step 232 operates by defining a number of saliency samples (520 in FIG. 15). The FOV may be referenced by a Cartesian coordinate system where the Z-axis is straight out from the depth camera 20 and the X-Y plane is perpendicular to the Z-axis. The saliency samples 520 may be defined in circles, semicircles, or partial circles in the X-Y plane at the joints of the arms and other joints in a given skeletal hypotheses. The saliency samples can also lie in "rails", as visible around the upper arm in FIG. 15. The rails are parallel lines on each side of a limb segment connecting adjacent joints, when these limb segments are not Z-aligned (the saliency samples around the lower arm are omitted in FIG. 15 for clarity). All of these samples, both on circles and rails, are set out at some distance (in the X-Y plane) away from the actual joints, or lines connecting the joints. The radius of a given sample must be large enough so that, if the hypothesis is correct, the samples will all lie just outside of the silhouette of the player's arm, even for a very bulky player. However, the radius should be no larger, in order to achieve optimum results.

Once the sample locations are laid out in X-Y, the actual and hypothetical depth values can be compared at each sample location. Then, if any of the saliency samples indicate a depth that is similar to the depth of the hypothesis, those samples are penalized. For example, in FIG. 15, saliency samples 520A (shown as filled squares in the figure) would be penalized around the upper arm and hand. If the depth map value is further than the hypothetical, this is a 'salient' sample and incurs a reward. And if the depth map value is closer than expected, this is an 'occlusion' sample and incurs a mild penalty. As noted, the trace and saliency scores for all samples may be tallied (step 234) to arrive at a score for the depth score methodology 196a. It is understood that tests other than the trace and saliency tests described above may be used to evaluate and score a given skeletal hypothesis against the depth data.

The depth score looks to how well a skeletal hypothesis was explained in the depth data. However, the depth data may define other foreground objects which are not explained by a given skeletal hypothesis. It may be that a given skeletal hypothesis has incorrectly identified a body part, and that these other foreground objects are in fact part of the target user's body. Therefore, using the explained space methodology 196b, the arbiter 196 examines whether a skeletal hypothesis has explained all of the foreground depth data. Referring to the flowchart of FIG. 16, the explained space methodology 196b checks in step 240 whether there are foreground objects which are not explained by the skeletal hypothesis then under consideration. If not, there is no penalty for the explained space score in step 242. However, if there is an unexplained object in the foreground, in step 244, the explained space methodology 196b may penalize the explained space score. The penalty may be based on a proximity of the unexplained object to a joint in the skeletal hypothesis. The closer the object to the skeletal hypothesis, the greater the penalty. The penalty may additionally or alternatively be based on a likelihood that the unexplained object could be the same type of body part as the proximate joint in the skeletal hypothesis. If Exemplar indicates that the unexplained object could also be the same body part as a proximate joint in the skeletal hypothesis, the explained space score is penalized higher than if it is unlikely that the unexplained and proximate skeletal joint could be the same body part.

The depth score 196a and explained space 196b methodologies can both be expensive if implemented naively (pixelwise) due to the large number of random accesses required. To circumvent this expense, an alternative embodiment of the present system processes the depth map from pixels into patches, a technique sometimes referred to as oversegmentation. Patches are chosen to have approximately constant depth, and equal world-space area. This means that patches further from the capture device 20 appear smaller in the image. In this embodiment, all(?) subsequent reasoning about the depth image will be expressed in terms of patches. For a modest loss of fidelity, the memory bandwidth requirements are reduced dramatically from millions of pixel accesses, to hundreds or thousands of patch accesses.

Once patches have been formed in this embodiment, the depth score and explained space methodologies may be performed by first assigning "ownership" of each patch to particular joints in a skeletal hypothesis. This assignment involves reasoning about occlusion. A wireframe skeleton may, from time-to-time, have joints (and bones between them) that are occluded by other parts of the model. It is important that patches are assigned appropriately so that whether a particular point in the model is either in error, or just invisible, can be judged. If it is invisible, it incurs less cost than when in error. However, some other part of the model should account for that region of space, hence the importance of this occlusion reasoning.

Ownership is determined by first assigning patches that intersect "bones" between joints, to their closest joint. Following this, the patches are "grown" from these seed points, assigning each patch to the seed patch to which it is most likely connected. At each step, including the initial bone-patch intersection pass, a "cost" is assigned to each patch, along with the joint that owns the patch. The initial cost is based on the depth discrepancy between the depth of the patch, and the depth of the bone. Then, as the known patches (patches that have been assigned to a joint) grow out over the unknown patches (in some embodiments, only across connected patches), both the owner joint and the cost propagate and are assigned to the new patches. In addition, sometimes the cost is increased by a small amount, when a patch grows onto another patch. When there are two known patches that could grow onto an unknown patch, the known patch with the lower cost will generally win. Known patches also have the opportunity to grow over other already-assigned (known) patches, if their cost is significantly lower and if the joints do not neighbor each other in the skeletal topology. In this way, errors in the initial intersection are generally corrected. A part of this process is that one joint may "steal" a patch away from another if it leads to smoother connectivity and it is this process which approximately accounts for occlusion. The depth score $196a$ cost is computed from the discrepancy between patches which intersect bones and the depth predicted by the model at these points (i.e. the initial costs), and might also be adjusted to reflect incorrect initial bone-patch intersections (where the patch ownership changed, between the initial intersection, and the final state). The explained space $196b$ cost is based on the number of growth steps required to assign ownership to all of the patches.

Another methodology used by arbiter 196 is static joint configuration score $196c$. The static joint configuration score $196c$ evaluates the lengths between adjacent joints in a skeletal hypothesis, and the angles formed by various joints in a skeletal hypothesis. To the extent the skeletal hypothesis defines distances between joints that are not possible (too long or too short) or are in disagreement (the ratios of lengths between various bones are too extreme), or angles formed by joints that are not possible (joints bending in ways that a human cannot bend), the static joint configuration score penalizes that skeletal hypothesis.

Figure 17:
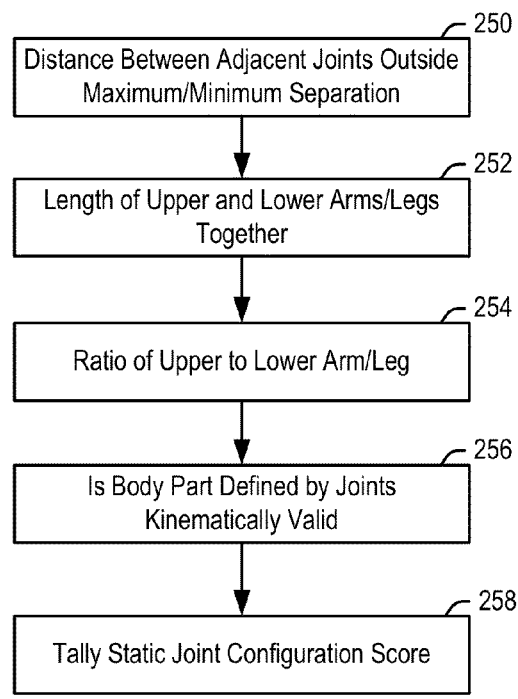
FIG. 17 is a flowchart of the operation of a third methodology of the arbiter according to an embodiment of the present technology.
Figure 18:
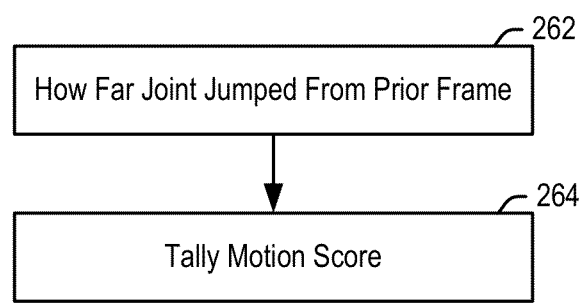
FIG. 18 is a flowchart of the operation of a fourth methodology of the arbiter according to an embodiment of the present technology.

Referring to the flowchart of FIG. 17, the arbiter 196 checks the lengths between adjacent joints in step 250. Step 250 may include for example checking whether the distance between the shoulders in the skeletal hypothesis is outside a minimum or maximum distance, whether the head is separated from the shoulders by a distance outside a minimum or maximum distance, whether the length of the upper and/or lower arms in the skeletal hypothesis are outside a minimum or maximum distance, and whether the length of the upper and/or lower legs in the skeletal hypothesis are outside a minimum or maximum distance. The maximum and minimum take into account the potential variance across the population of users. In further embodiments, the system may make deductions regarding the size of a particular target user 18, and tailor the maximum and minimum values for that particular user.

In step 252, the arbiter 196 may measure the length of the upper arm and lower arm, and upper leg and lower leg, for the skeletal hypothesis under consideration. Where the combined length of the upper and lower arms/legs is either too large or too small, the score for that skeletal hypothesis is penalized.

In step 254, instead of checking the total length, the arbiter 196 may run a subroutine checking the ratio of the upper arm length to the sum of the upper and lower arm lengths, and/or the ratio of the upper leg length to the sum of the upper and lower leg lengths, for the skeletal hypothesis under consideration. For example, the ratio of the upper arm length to the sum of the upper and lower arm lengths will commonly be between 0.45 and 0.52 in human bodies. Any arm/leg ratio outside of the given range for arms and legs may be penalized. The penalty may be proportional (but not necessarily linear) to the trespass outside of the expected range. Other ratios might be checked, for example, the ratio of the total average arm length, to the shoulder span; the ratio of the average arm length to the average leg length; the ratio of one arm's length to the other arm's length; and so on. In general, these scoring functions, as well as the other scoring functions described herein, may be continuous and differentiable.

In step 256 of the static joint configuration score methodology, the arbiter 196 may run a scoring subroutine which tests whether a given body part in a skeletal hypothesis is kinematically valid. That is, given a known range of motions of a human's body parts, including the head, upper and lower arms, upper and lower legs and the possible orientations of these body parts to the torso, can a person validly have joint positions in a given skeletal hypothesis. If not, the skeletal hypothesis may be penalized or removed. In embodiments, the kinematically valid scoring subroutine may begin by translating and rotating a person's position in 3-D real world space to a frame of reference of the person's torso (independent of real world space). While operation of this subroutine may be done using a person's position/orientation in real world space in further embodiments, it is computationally easier to first translate the user to a frame of reference of the person's torso.

In this frame of reference, the ortho-normal basis vectors for torso space can be visualized as: +X is from the left shoulder to the right shoulder; +Y is up the torso/spine; and +Z is out through the player's chest (i.e., generally the opposite of +Z in world-space). Again, this frame of reference is by way of example only and may vary in further embodiments.

Thereafter, for a given body part position, the arbiter 196 checks whether the body part is kinematically valid with respect to the rest of the body. For example, in step 256, the arbiter may check whether a lower arm lies within a cone defining the possible positions (direction and angle) of the lower arm for the given upper arm position. Using the above-described ortho-normal basis vectors, the upper arm might lie along (or in-between) six ortho-normal vector positions (upper arm forward, upper arm back, upper arm left, upper arm right up and upper arm down). For each of these orthonormal directions of the upper arm, a corresponding cone that defines the possible directions of the lower arm is simple to specify and is generally known. Because the direction of the upper arm (in the hypothesis) is rarely aligned exactly to one of these six orthonormal directions, and instead often lies in-between several of them, the cone definitions associated with the nearest orthonormal upper-arm directions are blended together, to produce a new cone that is tailored for the specific direction in which the upper arm lies. In this blending, the cones of the axes along which the upper arm most closely aligns will receive more weight, and the cones of the axes that lie in the opposite direction of the upper arm will have zero weight. Once the blended cone is known, the lower arm is then tested to see if it lies within the cone. A skeletal hypothesis in which the lower arm's direction does not fall into the blended cone (of valid lower arm directions) may then be penalized, or if egregious, may be discarded. The penalty may be linear or non-linear. The same process may be used to test and score other body parts in a skeletal hypothesis under consideration.

It is understood that there are other methods of testing kinematically valid arm positions. Such methods include pose dictionary lookups, neural networks, or any number of other classification techniques. Further, the same tests may be applied to other limbs, such as legs, the neck and head, and even the upper vs. lower body. The static joint configuration score is tallied in step 258.

Although not shown in FIG. 8, there may be another scoring methodology which checks for self-penetration or self-collision, and penalizes it. Details relating to such a scoring methodology are described for example in the above-referenced U.S. patent application Ser. No. 12/363,604. However, in general, in such a methodology the different parts of the body can be represented by simple volumetric primitives (rounded cylinders, polygonal meshes). Such volumetric primitives may be inexpensively checked to see if these intersect each other, using well-known techniques. If so, a penalty is applied.

The arbiter 196 further includes the motion score methodology 196*d*. In determining the motion score 196*d*, the arbiter 196 compares joint positions in the current frame against the positions of the same joints identified for a previous frame in step 262, for example the immediately preceding frame. Larger jumps would tend to indicate that the current candidate is not the same joint and the score would be penalized accordingly. For example, if the final hand from the previous frame was at certain coordinates, and this hypothesis's hand is at new coordinates, this methodology looks at the distance between the two coordinates. If the distance is small, then there is no penalty incurred, but if the distance is large, a penalty is incurred. This means that other evidence must be present to counteract the penalty, and justify the sudden move. This methodology may compare to the previous frame joint position, as well as the projected new joint position, or even compute both distances and base the score on the shorter distance. If the prior final output had a poor score (i.e. low confidence), these penalties may be scaled down or not applied at all. A penalty here may be linear or non-linear. The motion score may be tallied in step 264.

Using the above methodologies, the arbiter may select one, or possibly more than one, skeletal hypothesis having the highest score as the best state estimate $x_t$ most closely approximating the player pose in that frame or other time period t. The highest scoring skeletal hypothesis (or hypotheses) may then be output as explained below. Alternatively, a re-sampling operation 198 may be performed on the skeletal hypotheses as is also explained below. While the above describes a clear division between experts and the arbiter, it is understood that there may be some flexibility as to whether one of the above-described experts, or some other model fitting algorithm, is incorporated as an expert or whether it is incorporated as a methodology in the arbiter for resolving skeletal hypotheses or other computer models of a user.

In embodiments, the highest scored skeletal hypothesis may need to exceed some predetermined threshold value in order to be considered accurate. In the event the highest scored skeletal hypothesis is below the threshold, the pipeline may not return a state estimate for that time frame, or it may return a state estimate with an indication of low reliability. This reliability indication may be used by a gaming or other application receiving the state estimate, which may then elect to use or not use the state estimate for that time frame. The reliability indication may also be fed back into the pipeline so that future determinations of state estimates using historical data can factor in that the state estimate for the current time frame may not be a reliable source of information by which to make state determinations in future time frames.

The above sets forth four methodologies by which the arbiter may evaluate and score the various skeletal hypotheses. It is appreciated that a variety of other methodologies may be used in addition to or instead of those discussed above in further embodiments. One feature of the present system is the modularity of the experts and arbiter methodologies. The portfolio of experts can be interchanged independently of each other and the arbiter, and the same is true of the methodologies employed by the arbiter. Such a system is highly flexible and adaptable to changing circumstances. Another feature of the present system in maintaining a plurality of skeletal hypotheses and evaluating each is that this results in a system of least commitment. Many possible skeletal hypotheses are considered throughout the model fitting phase of the pipeline, without making hard decisions until such decisions can no longer be avoided. This may occur, for example, just prior to the capture of a new frame of image data, where it is time for the system to output its best guess as to one or more skeletal hypotheses that best represent the player position in that time frame.

In embodiments of the present system, the final stage of the tracking pipeline may involve re-sampling 198 (FIG. 8) the skeletal hypotheses according to their weight (score) or a function thereof. That is, a new set of skeletal hypotheses may be selected from the original set of skeletal hypotheses for that frame, with those skeletal hypotheses scoring higher having a greater chance of being selected into the re-sampled set. The effect of this is to make it more likely that bad skeletal hypotheses are culled from the set, which otherwise might make it through to the final output.

As indicated in FIGS. 6 and 8, a final step 152 in the pipeline involves outputting the selected best state estimate of the most accurate skeletal hypothesis or hypotheses. The output may be used for at least two purposes. First, the output may be used by the gaming or other application to affect some action in the application. For example, the state estimate may be used to recognize a user gesture, interact with an object within the application or control some other in-game function. Other uses of the state estimate by the application are contemplated. Second, the output from a given time frame may then be fed back into the pipeline as state history 199 and used as historical skeletal data in future time frames. As noted above, it may happen that no single skeletal hypothesis exceeds a threshold confidence value. In this event, the state estimate for the current frame may be omitted, or may be given little weight as a state estimate in later use by the pipeline or gaming application.

The output 152 can be performed in any suitable manner. As a non-limiting example, an application programming interface (API) may be used to report the selected skeletal hypothesis. Such an API may be configured to communicate the joint positions, joint velocities, joint accelerations, confidences in positions, velocities, and/or accelerations, and/or other information related to the selected skeleton for one or more targets. A content receiver (e.g., a gaming application) may then use the reported information as desired.

Figure 19A:
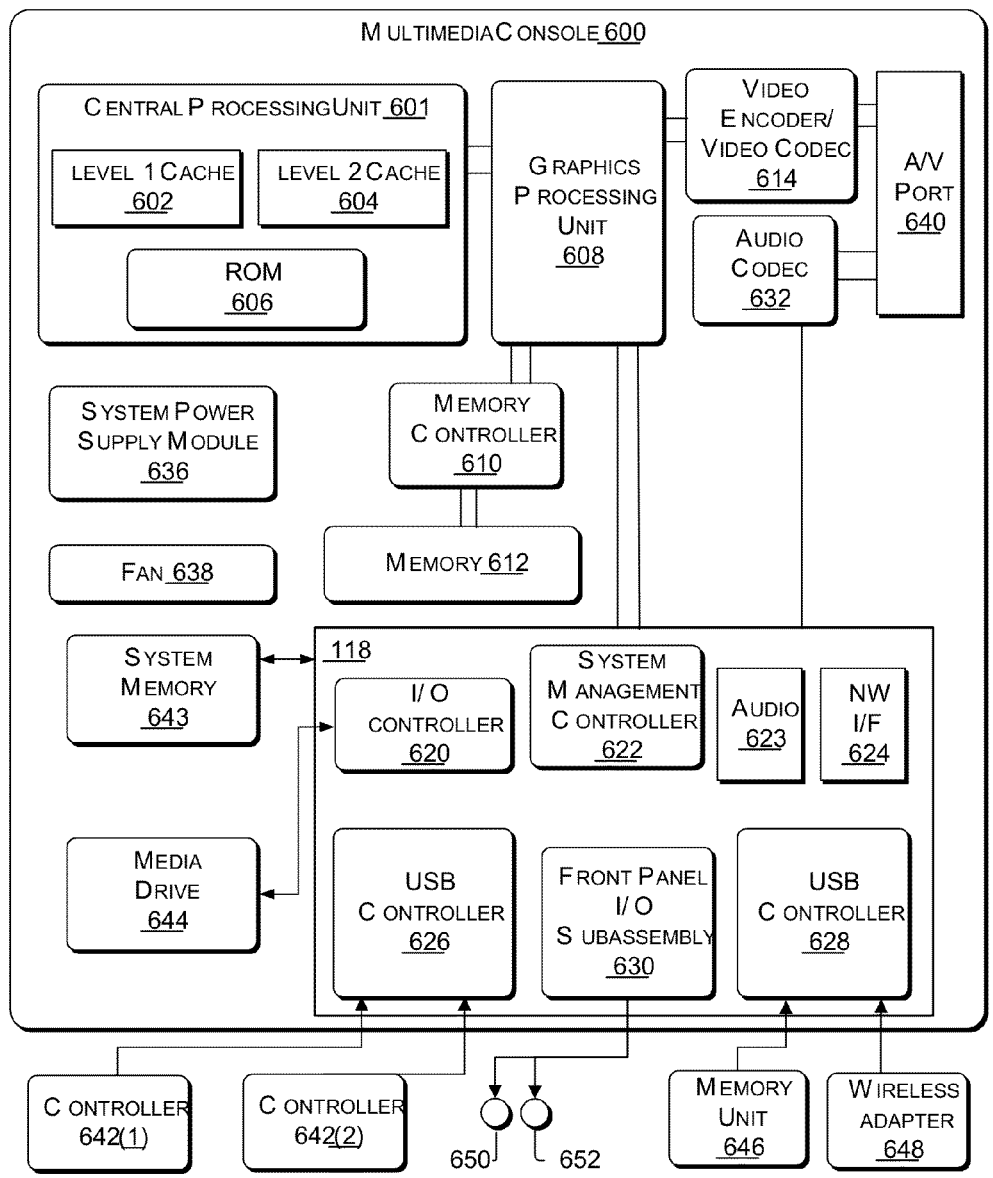
FIG. 19A illustrates an example embodiment of a computing environment that may be used to interpret one or more gestures in a target recognition, analysis, and tracking system.

FIG. 19A illustrates an example embodiment of a computing environment that may be used to interpret one or more positions and motions of a user in a target recognition, analysis, and tracking system. The computing environment such as the computing environment 12 described above with respect to FIGS. 1A-2 may be a multimedia console 600, such as a gaming console. As shown in FIG. 19A, the multimedia console 600 has a central processing unit (CPU) 601 having a level 1 cache 602, a level 2 cache 604, and a flash ROM 606. The level 1 cache 602 and a level 2 cache 604 temporarily store data and hence reduce the number of memory access cycles, thereby improving processing speed and throughput. The CPU 601 may be provided having more than one core, and thus, additional level 1 and level 2 caches 602 and 604. The flash ROM 606 may store executable code that is loaded during an initial phase of a boot process when the multimedia console 600 is powered ON.

A graphics processing unit (GPU) 608 and a video encoder/video codec (coder/decoder) 614 form a video processing pipeline for high speed and high resolution graphics processing. Data is carried from the GPU 608 to the video encoder/video codec 614 via a bus. The video processing pipeline outputs data to an A/V (audio/video) port 640 for transmission to a television or other display. A memory controller 610 is connected to the GPU 608 to facilitate processor access to various types of memory 612, such as, but not limited to, a RAM.

The multimedia console 600 includes an I/O controller 620, a system management controller 622, an audio processing unit 623, a network interface controller 624, a first USB host controller 626, a second USB host controller 628 and a front panel I/O subassembly 630 that are preferably implemented on a module 618. The USB controllers 626 and 628 serve as hosts for peripheral controllers 642(1)-642(2), a wireless adapter 648, and an external memory device 646 (e.g., flash memory, external CD/DVD ROM drive, removable media, etc.). The network interface 624 and/or wireless adapter 648 provide access to a network (e.g., the Internet, home network, etc.) and may be any of a wide variety of various wired or wireless adapter components including an Ethernet card, a modem, a Bluetooth module, a cable modem, and the like.

System memory 643 is provided to store application data that is loaded during the boot process. A media drive 644 is provided and may comprise a DVD/CD drive, hard drive, or other removable media drive, etc. The media drive 644 may be internal or external to the multimedia console 600. Application data may be accessed via the media drive 644 for execution, playback, etc. by the multimedia console 600. The media drive 644 is connected to the I/O controller 620 via a bus, such as a Serial ATA bus or other high speed connection (e.g., IEEE 1394).

The system management controller 622 provides a variety of service functions related to assuring availability of the multimedia console 600. The audio processing unit 623 and an audio codec 632 form a corresponding audio processing pipeline with high fidelity and stereo processing. Audio data is carried between the audio processing unit 623 and the audio codec 632 via a communication link. The audio processing pipeline outputs data to the A/V port 640 for reproduction by an external audio player or device having audio capabilities.

The front panel I/O subassembly 630 supports the functionality of the power button 650 and the eject button 652, as well as any LEDs (light emitting diodes) or other indicators exposed on the outer surface of the multimedia console 600. A system power supply module 636 provides power to the components of the multimedia console 600. A fan 638 cools the circuitry within the multimedia console 600.

The CPU 601, GPU 608, memory controller 610, and various other components within the multimedia console 600 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 600 is powered ON, application data may be loaded from the system memory 643 into memory 612 and/or caches 602, 604 and executed on the CPU 601. The application may present a graphical user interface that provides a consistent user experience when navigating to different media types available on the multimedia console 600. In operation, applications and/or other media contained within the media drive 644 may be launched or played from the media drive 644 to provide additional functionalities to the multimedia console 600.

The multimedia console 600 may be operated as a standalone system by simply connecting the system to a television or other display. In this standalone mode, the multimedia console 600 allows one or more users to interact with the system, watch movies, or listen to music. However, with the integration of broadband connectivity made available through the network interface 624 or the wireless adapter 648, the multimedia console 600 may further be operated as a participant in a larger network community.

When the multimedia console 600 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 600 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 601 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 642(1) and 642(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 600.

Figure 19B:
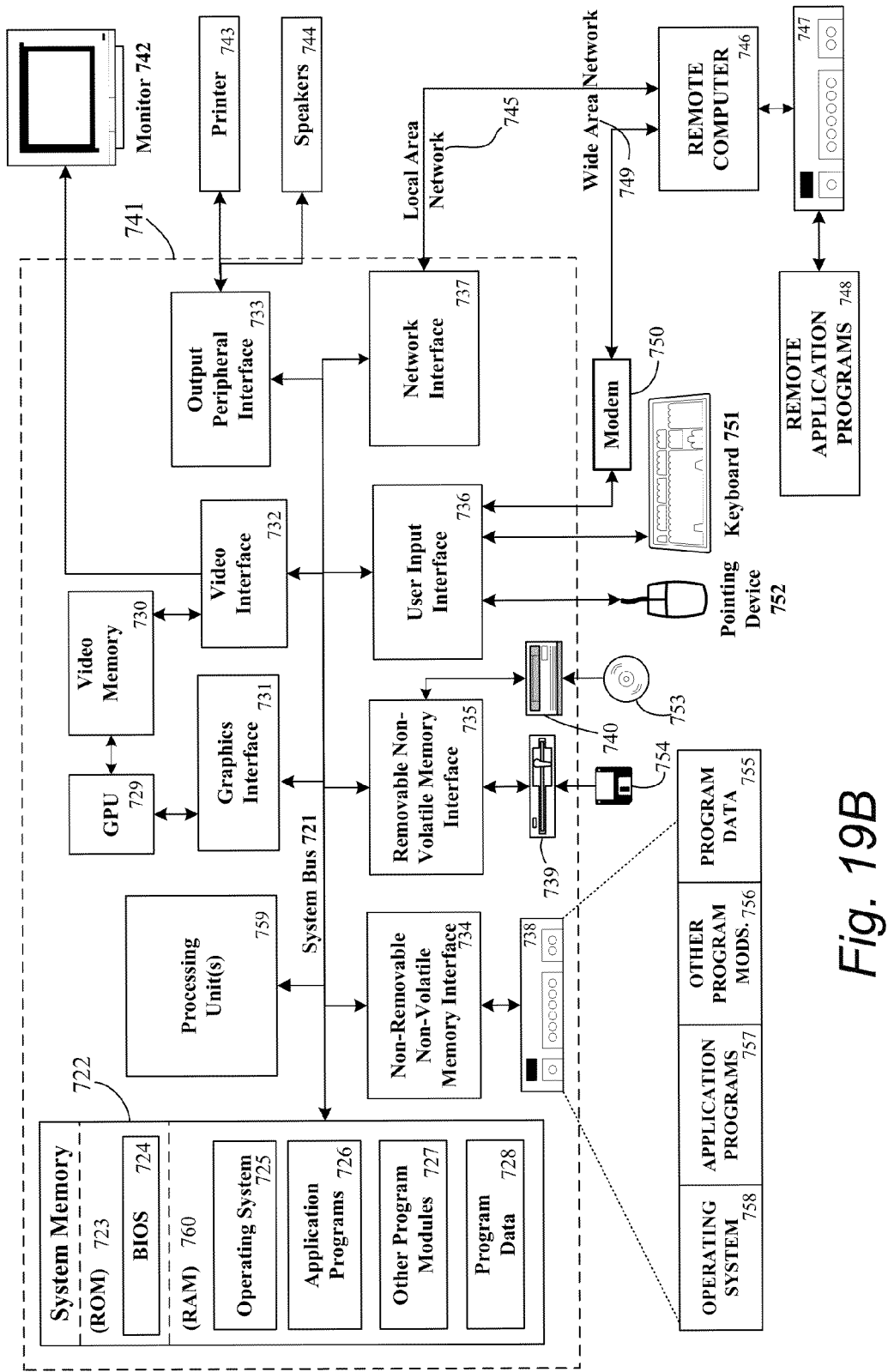
FIG. 19B illustrates another example embodiment of a computing environment that may be used to interpret one or more gestures in a target recognition, analysis, and tracking system.

FIG. 19B illustrates another example embodiment of a computing environment 720 that may be the computing environment 12 shown in FIGS. 1A-2 used to interpret one or more positions and motions in a target recognition, analysis, and tracking system. The computing system environment 720 is only one example of a suitable computing environment and is not intended to suggest any limitation as to the scope of use or functionality of the presently disclosed subject matter. Neither should the computing environment 720 be interpreted as having any dependency or requirement relating to any one or combination of components illustrated in the Exemplary operating environment 720. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 19B, the computing environment 720 comprises a computer 741, which typically includes a variety of computer readable media. Computer readable media can be any available media that can be accessed by computer 741 and includes both volatile and nonvolatile media, removable and non-removable media. The system memory 722 includes computer storage media in the form of volatile and/or nonvolatile memory such as ROM 723 and RAM 760. A basic input/output system 724 (BIOS), containing the basic routines that help to transfer information between elements within computer 741, such as during start-up, is typically stored in ROM 723. RAM 760 typically contains data and/or program modules that are immediately accessible to and/or presently being operated on by processing unit 759. By way of example, and not limitation, FIG. 19B illustrates operating system 725, application programs 726, other program modules 727, and program data 728. FIG. 19B further includes a graphics processor unit (GPU) 729 having an associated video memory 730 for high speed and high resolution graphics processing and storage. The GPU 729 may be connected to the system bus 721 through a graphics interface 731.

The computer 741 may also include other removable/non-removable, volatile/nonvolatile computer storage media. By way of example only, FIG. 19B illustrates a hard disk drive 738 that reads from or writes to non-removable, nonvolatile magnetic media, a magnetic disk drive 739 that reads from or writes to a removable, nonvolatile magnetic disk 754, and an optical disk drive 740 that reads from or writes to a removable, nonvolatile optical disk 753 such as a CD ROM or other optical media. Other removable/non-removable, volatile/nonvolatile computer storage media that can be used in the Exemplary operating environment include, but are not limited to, magnetic tape cassettes, flash memory cards, digital versatile disks, digital video tape, solid state RAM, solid state ROM, and the like. The hard disk drive 738 is typically connected to the system bus 721 through a non-removable memory interface such as interface 734, and magnetic disk drive 739 and optical disk drive 740 are typically connected to the system bus 721 by a removable memory interface, such as interface 735.

The drives and their associated computer storage media discussed above and illustrated in FIG. 19B, provide storage of computer readable instructions, data structures, program modules and other data for the computer 741. In FIG. 19B, for example, hard disk drive 738 is illustrated as storing operating system 758, application programs 757, other program modules 756, and program data 755. Note that these components can either be the same as or different from operating system 725, application programs 726, other program modules 727, and program data 728. Operating system 758, application programs 757, other program modules 756, and program data 755 are given different numbers here to illustrate that, at a minimum, they are different copies. A user may enter commands and information into the computer 741 through input devices such as a keyboard 751 and a pointing device 752, commonly referred to as a mouse, trackball or touch pad. Other input devices (not shown) may include a microphone, joystick, game pad, satellite dish, scanner, or the like. These and other input devices are often connected to the processing unit 759 through a user input interface 736 that is coupled to the system bus, but may be connected by other interface and bus structures, such as a parallel port, game port or a universal serial bus (USB). The cameras 26, 28 and capture device 20 may define additional input devices for the console 700. A monitor 742 or other type of display device is also connected to the system bus 721 via an interface, such as a video interface 732. In addition to the monitor, computers may also include other peripheral output devices such as speakers 744 and printer 743, which may be connected through an output peripheral interface 733.

The computer 741 may operate in a networked environment using logical connections to one or more remote computers, such as a remote computer 746. The remote computer 746 may be a personal computer, a server, a router, a network PC, a peer device or other common network node, and typically includes many or all of the elements described above relative to the computer 741, although only a memory storage device 747 has been illustrated in FIG. 19B. The logical connections depicted in FIG. 19B include a local area network (LAN) 745 and a wide area network (WAN) 749, but may also include other networks. Such networking environments are commonplace in offices, enterprise-wide computer networks, intranets and the Internet.

When used in a LAN networking environment, the computer 741 is connected to the LAN 745 through a network interface or adapter 737. When used in a WAN networking environment, the computer 741 typically includes a modem 750 or other means for establishing communications over the WAN 749, such as the Internet. The modem 750, which may be internal or external, may be connected to the system bus 721 via the user input interface 736, or other appropriate mechanism. In a networked environment, program modules depicted relative to the computer 741, or portions thereof, may be stored in the remote memory storage device. By way of example, and not limitation, FIG. 19B illustrates remote application programs 748 as residing on memory device 747. It will be appreciated that the network connections shown are Exemplary and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. In a system including a computing environment coupled to a capture device for capturing image data from a field of view of the capture device, the image data representing a position of a user, a method of estimating user body position comprising:
    (a) receiving image data from the field of view;
    (b) applying one or more computer models for generating body part proposals from the image data, at least one computer model accounting for missing joint information by using a position of the missing joint identified in a past frame as a basis for the position of the missing joint in the current frame; and
    (c) analyzing the one or more computer models produced in said step (b) by one or more methodologies to choose at least one computer model of the one or more computer models estimated to provide the best body part proposal.

2. The method of claim 1, further comprising the step (d) of generating a confidence level in the one or more computer models estimated to be the best representation of the state information.

3. The method of claim 1, said step (b) of applying one or more computer models comprising the step of applying one or more computer models based on the image data from the field of view captured in a current frame.

4. The method of claim 3, said of applying one or more computer models based on the image data from the field of view captured in a current frame comprising the step of applying one or more computer models based on body part proposals computed from the image data from the current field of view.

5. The method of claim 1, said step (b) of applying one or more computer models comprising the step of applying one or more computer models based on the image data from the field of view captured in a prior frame.

6. The method of claim 1, said step (b) of applying one or more computer models comprising the step of applying one or more computer models based on computing body part proposals from the image data and generating one or more skeletal hypotheses from the body part proposals by a known configuration of how body parts are connected in humans.

7. The method of claim 6, said step of generating one or more skeletal hypotheses from the body part proposals by a known configuration of how body parts are connected in humans comprising the step of generating skeletal hypotheses from at least one of a tree structure of a human body including a torso and limbs as branches, a head triangle including a triangle formed by a head and shoulders and a torso volume including a torso.

8. The method of claim 1, said step (b) of applying one or more computer models comprising the step of identifying a body part in a past frame that is proximate to a body part indicated in the depth image in a current frame, identifying whether the body part from the past and current frame may be the same body part, and snapping the position of the body part from the last frame to the depth image in the current frame.

9. The method of claim 1, said step (b) of applying one or more computer models comprising the step of applying one or more skeletal hypotheses including an estimated position of joints of a user captured for the frame by the capture device.

10. A software pipeline for generating a state estimate for a given frame of captured image data, the state estimate representing an estimate of a position of a user within a field of view captured within the image data, comprising:
    one or more experts for receiving information including one or more body part proposals and generating a plurality of computer models, each computer model representing an estimation of the position of the user in the given frame of captured image data at least one of the experts generating skeletal hypotheses from at least one of a tree structure of a human body including a torso and limbs as branches, a head triangle including a triangle formed by a head and shoulders and a torso volume including a torso; and
    an arbiter for receiving the plurality of computer models, scoring the computer models by one or more methodologies, and outputting at least one computer model estimated by the arbiter to best approximate the position of the user in the frame.

11. A software pipeline as recited in claim 10, the arbiter further including a depth score methodology for scoring each of the plurality of computer models by examining the computer model against the depth data for the given frame.

12. A software pipeline as recited in claim 11, wherein the depth score methodology examines trace and saliency samples in scoring each of the plurality of computer models.

13. A software pipeline as recited in claim 10, the arbiter further including an explained space methodology for scoring each of the plurality of computer models by examining how well the computer model explains all of the depth data in the foreground.

14. A software pipeline as recited in claim 10, the arbiter further including a static joint configuration scoring methodology for scoring each of the plurality of computer models by examining whether the computer models have lengths and angles between joints which conform to lengths and angles that are possible for body parts of a human body.

15. A software pipeline as recited in claim 10, the arbiter further including a motion scoring methodology for scoring each of the plurality of computer models by examining image data and/or a state estimation for a prior frame and determining the likelihood that a body part indicated by a computer model could have moved to the position indicated in the given frame from the position indicated in the prior frame within the time elapsed between the given frame and prior frame.

16. A computer-readable storage medium capable of programming a processor to perform a method tracking body parts of a user to determine a state estimate of the user's position in a current frame of image data, comprising:
    (a) generating a plurality of skeletal hypotheses, the plurality of skeletal hypotheses defining a probability distribution;
    (b) selecting one or more skeletal hypotheses as being the most probable state estimates based on the probability distribution, where the probability distribution indicates one or more skeletal hypotheses as the probable state estimate; and (c) indicating that no state estimate is determined for the frame of image data where the probability distribution does not indicate one or more skeletal hypotheses as being probable state estimates.

17. A computer-readable storage medium as recited in claim 16, said step (b) of selecting one or more skeletal hypotheses as being the most probable state estimates comprising the steps of scoring the skeletal models based on an evaluation of each skeletal model relative to at least one of the image data for the current frame and a state estimate from a frame earlier than the current flame of image data.

18. A computer-readable storage medium as recited in claim 16, further comprising the step of re-sampling the skeletal hypotheses to arrive at a final set of skeletal hypotheses, with a skeletal hypothesis having a higher probability having a greater chance of being selected into the final set of skeletal hypotheses.

19. A computer-readable storage medium as recited in claim 16, said step (c) comprising the step of scoring the skeletal hypotheses and indicating that no state estimate is determined for the flame of image data where no skeletal hypothesis scores above a predetermined threshold value.

* * * * *